US012770399B2

(12) United States Patent
Suzuki

(10) Patent No.: US 12,770,399 B2
(45) Date of Patent: Oct. 20, 2026

(54) COMPUTER-READABLE RECORDING MEDIUM STORING INFORMATION PROCESSING PROGRAM, INFORMATION PROCESSING METHOD, AND INFORMATION PROCESSING DEVICE

(71) Applicant: FUJITSU LIMITED, Kawasaki (JP)

(72) Inventor: Genta Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 422 days.

(21) Appl. No.: 17/745,061

(22) Filed: May 16, 2022

(65) Prior Publication Data

US 2023/0034988 A1 Feb. 2, 2023

(30) Foreign Application Priority Data

Jul. 30, 2021 (JP) ................................ 2021-125672

(51) Int. Cl.
*G06V 20/52* (2022.01)
*G06Q 30/0601* (2023.01)
(Continued)

(52) U.S. Cl.
CPC .............. *G06V 20/52* (2022.01); *G06V 40/10* (2022.01); *G06V 40/20* (2022.01); *G08B 13/196* (2013.01); *G06Q 30/0609* (2013.01)

(58) Field of Classification Search
CPC ........ G06V 20/52; G06V 40/10; G06V 40/20; G06V 20/44; G06V 40/23; G06Q 30/0609;
(Continued)

(56) References Cited

U.S. PATENT DOCUMENTS

2011/0035257 A1* 2/2011 Solanki ................ G06Q 10/043 705/7.31
2016/0210829 A1 7/2016 Uchida et al.
(Continued)

FOREIGN PATENT DOCUMENTS

JP 2010-97458 A 4/2010
JP 2019-193089 A 10/2019
(Continued)

OTHER PUBLICATIONS

Japanese Office Action mailed Apr. 4, 2023 for corresponding Japanese Patent Application No. 2021-125672, with English Translation, 25, pages.
(Continued)

*Primary Examiner* — Andrew W Bee
*Assistant Examiner* — Winta Gebreslassie
(74) *Attorney, Agent, or Firm* — Fujitsu Intellectual Property Center

(57) ABSTRACT

A non-transitory computer-readable recording medium stores an information processing program for causing a computer to execute processing including: generating skeletal information of a person who stays in a store from a captured image; detecting a specific action of the person for a product using the skeletal information; specifying an area where the person is staying when having detected the specific action in the store using positional information of the person in the image; specifying setting information associated with the specified area; and changing a parameter that evaluates a behavior of the person for the product on the basis of the specified setting information.

9 Claims, 21 Drawing Sheets

(51) Int. Cl.
*G06V 40/10* (2022.01)
*G06V 40/20* (2022.01)
*G08B 13/196* (2006.01)

(58) Field of Classification Search
CPC . G08B 13/196; G08B 21/02; G08B 13/19608
See application file for complete search history.

(56) References Cited

U.S. PATENT DOCUMENTS

| | | | | |
|---|---|---|---|---|
| 2017/0046707 | A1 | 2/2017 | Krause et al. | |
| 2019/0236530 | A1* | 8/2019 | Cantrell | G06V 40/23 |
| 2019/0327451 | A1 | 10/2019 | Takeno | |
| 2020/0118401 | A1* | 4/2020 | Zalewski | G07G 1/0072 |
| 2020/0364997 | A1* | 11/2020 | Okamoto | G06V 40/172 |

FOREIGN PATENT DOCUMENTS

| | | | | |
|---|---|---|---|---|
| WO | 2015/033576 | A1 | 3/2015 | |
| WO | WO-2020222236 | A1 * | 11/2020 | G06N 3/0442 |

OTHER PUBLICATIONS

European Office Action dated Oct. 2, 2023 for corresponding European Patent Application No. 22180685.4, 7 pages.

Extended European Search Report dated Dec. 5, 2022 for corresponding European Patent Application No. 22180685.4, 12 pages.

* cited by examiner

FIG. 6

33

| AREA | AREA COORDINATES | AREA DIVISION |
|---|---|---|
| A | {(400,100),(560,250),(560,320),(400,170)} | HIGH-PRICED AND SMALL PRODUCTS |
| B | {(400,175),(560,325),(560,395),(400,260)} | LOW-PRICED AND SMALL PRODUCTS |
| C | {(400,265),(560,315),(560,415),(400,365)} | LARGE PRODUCTS |
| ... | ... | ... |

FIG. 12

| AREA | AREA COORDINATES | SHELF DIVISION | SPEED X FOR TAKING OUT PRODUCT FROM SHELF | SPEED Y FOR PUTTING PRODUCT IN BASKET | TIME T TILL PRODUCT REGISTRATION |
|---|---|---|---|---|---|
| A | {(400,100),(560,250),(560,320),(400,170)} | HIGH-PRICED AND SMALL PRODUCTS | 1.0 | 0.6 | 5 |
| B | {(400,175),(560,325),(560,395),(400,260)} | LOW-PRICED AND SMALL PRODUCTS | 1.0 | 0.6 | 10 |
| C | {(400,265),(560,315),(560,415),(400,365)} | LARGE PRODUCTS | 0.5 | 0.3 | 15 |
| ... | ... | ... | ... | ... | ... |

COMPUTER-READABLE RECORDING MEDIUM STORING INFORMATION PROCESSING PROGRAM, INFORMATION PROCESSING METHOD, AND INFORMATION PROCESSING DEVICE

CROSS-REFERENCE TO RELATED APPLICATION

This application is based upon and claims the benefit of priority of the prior Japanese Patent Application No. 2021-125672, filed on Jul. 30, 2021, the entire contents of which are incorporated herein by reference.

FIELD

The embodiment discussed herein is related to an information processing program, an information processing method, and an information processing device.

BACKGROUND

In retail stores, to reduce congestion at cash registers, a system has been introduced, in which customers themselves scan and register products and perform payment. Moreover, in recent years, introduction of a system has begun, in which customers perform product scan at places other than cash registers, for example, at a sales floor where the customers have picked up each of the products, using an application installed on terminals rented out in stores of retail stores or terminals possessed by the customers. In such systems in which the customers themselves perform product scan, scan omission of the products needs to be detected in order to detect a fraudulent behavior such as shoplifting.

Japanese Laid-open Patent Publication No. 2019-193089 and U.S. Patent Application Publication No. 2017/0046707 are disclosed as related art.

SUMMARY

According to an aspect of the embodiments, a non-transitory computer-readable recording medium stores an information processing program for causing a computer to execute processing including: generating skeletal information of a person who stays in a store from a captured image; detecting a specific action of the person for a product using the skeletal information; specifying an area where the person is staying when having detected the specific action in the store using positional information of the person in the image; specifying setting information associated with the specified area; and changing a parameter that evaluates a behavior of the person for the product on the basis of the specified setting information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram illustrating an example of data stored in area information 33 according to the first embodiment;

FIG. 12 is a diagram illustrating an example of parameter change according to the first embodiment;

DESCRIPTION OF EMBODIMENTS

Meanwhile, as a system for detecting a fraudulent behavior of customers in retail stores, for example, a system for detecting a suspicious behavior and a fraudulent behavior such as shoplifting of the customers has been developed by using a surveillance camera in the stores.

However, in each sales floor, various products with different types, sizes, and unit prices are contained on shelves, or the like. For example, the customers' action to take out the products from the shelves or perform product scan vary depending on the types, sizes, and the like of the products. Therefore, there have been cases where maintenance of accuracy of detecting scan omission is not possible or difficult depending on the products.

In one aspect, an object is to provide an information processing program, an information processing method, and an information processing device capable of improving the accuracy of detecting scan omission of products in a system in which customers themselves perform product scan.

Hereinafter, examples of an information processing program, an information processing method, and an information processing device according to the present embodiments will be described in detail with reference to the drawings. Note that the present embodiment is not limited by the examples. Furthermore, the embodiments may be appropriately combined with each other within a range without inconsistency.

First Embodiment

Figure 1:
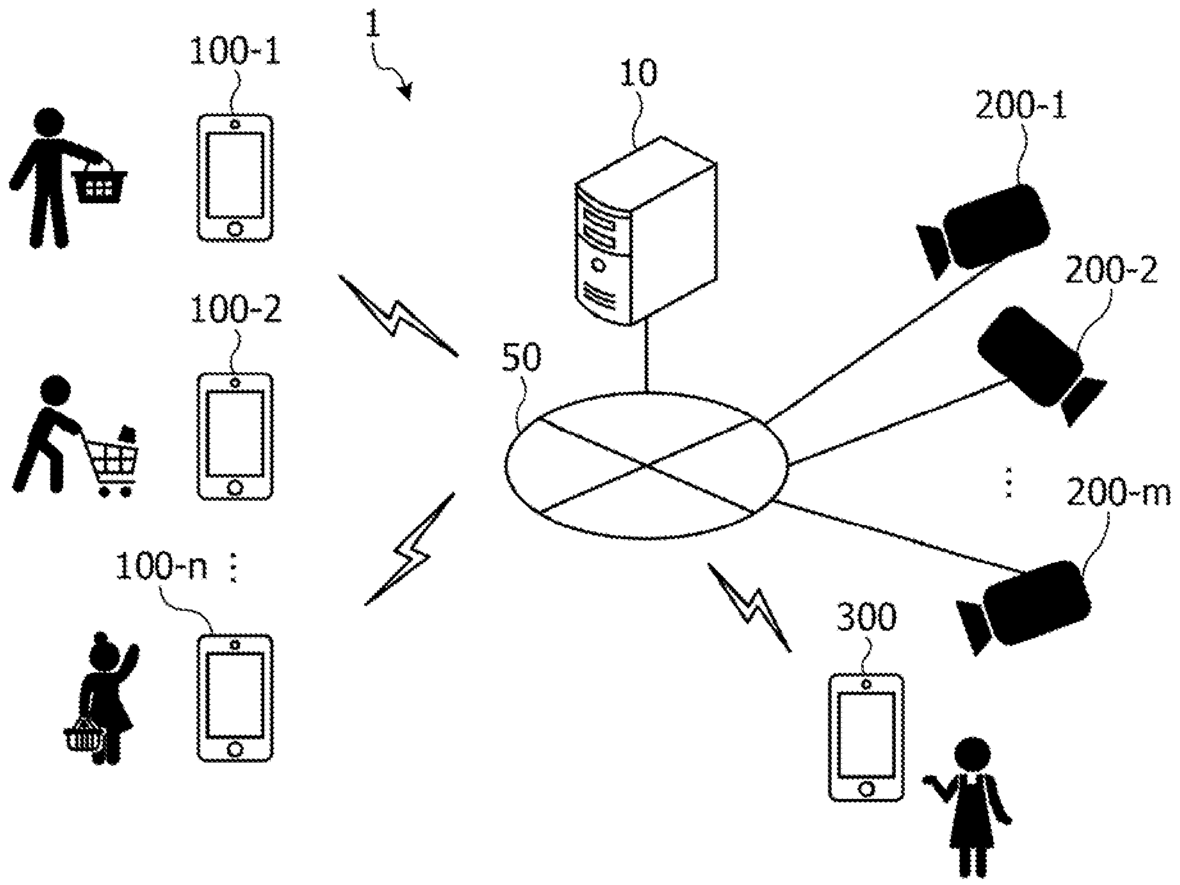
FIG. 1 is a diagram illustrating a configuration example of a fraud detection system according to a first embodiment.

First, a fraud detection system for implementing the present embodiment will be described. FIG. 1 is a diagram illustrating a configuration example of a fraud detection system according to a first embodiment. As illustrated in FIG. 1, a fraud detection system 1 is a system in which a fraud detection device 10 and user terminals 100-1 to **100-*n* (n is an arbitrary integer, hereinafter collectively referred to as "user terminal(s) 100") are connected to be able to communicate with one another via a network 50**.

Furthermore, the fraud detection device 10 is also connected with camera devices 200-1 to **200-*m* (m is an arbitrary integer, hereinafter collectively referred to as "camera device(s) 200") and a clerk terminal 300 to be able to communicate with one another via the network 50**.

For the network 50, various communication networks such as an intranet used in a store of a retail store can be adopted regardless of whether the network is wired or wireless, for example. Furthermore, the network 50 may not be a single network, and may be, for example, the intranet and the internet configured via a network device such as a gateway or other devices (not illustrated). Note that the inside of the store of the retail store is not limited to indoors, but may include outdoors on the premises.

The fraud detection device 10 is, for example, an information processing device such as a desktop personal computer (PC), a notebook PC, or a server computer installed in the store of the retail store and used by a store staff, an administrator, and the like.

The fraud detection device 10 receives, from the camera device 200, a plurality of images obtained by the camera device 200 capturing a predetermined imaging range such as the inside of the store of the retail store or the premises. Note that, strictly speaking, the plurality of images is a video captured by the camera device 200, that is, a series of frames of a moving image.

Furthermore, the fraud detection device 10 specifies a customer staying in the store (hereinafter may be simply referred to as a "person"), a shopping basket carried by the person (hereinafter may be simply referred to as a "basket"), or the user terminal 100 from the captured images, using an existing object detection technique. Furthermore, the fraud detection device 10 generates skeletal information of the specified person and estimates a posture of the person from the captured images, and specifies an action to put a product in the basket or an action to register the product to the user terminal 100, using an existing skeleton detection technique.

Furthermore, the fraud detection device 10 evaluates a behavior of each customer for the product. More specifically, the fraud detection device 10 determines that scan omission of the product has occurred in a case where the action to put the product in the basket has been specified but the action to register the product to the user terminal 100 is not specified for each customer, for example. Then, in the case of detecting the customer's fraudulent behavior such as the scan omission of the product, the fraud detection device 10 notifies the clerk terminal 300 of an alert.

Note that FIG. 1 illustrates the fraud detection device 10 as one computer. However, the fraud detection device 10 may be a distributed computing system configured by a plurality of computers. Alternatively, the fraud detection device 10 may be a cloud computer device managed by a service provider that provides a cloud computing service.

The user terminal 100 is an information processing terminal for the customer himself/herself to scan a barcode of the product or the like and register the product to be purchased in order to purchase the product. The user terminal 100 may be a mobile terminal such as a smartphone or tablet personal computer (PC) owned by the customer, or may be a dedicated terminal rented out in the store. An application for, for example, scanning and registering the product is pre-installed on the user terminal 100.

The camera device 200 is, for example, a surveillance camera installed in the store of the retail store or on the premises. Note that, although FIG. 1 illustrates the plurality of camera devices 200, the number of the camera devices may be one in the case of a small store or the like, for example. The video captured by the camera device 200 is transmitted to the fraud detection device 10.

The clerk terminal 300 may be a mobile terminal such as a smartphone or tablet PC possessed by a clerk of the retail store or may be an information processing device such as a desktop PC or a notebook PC installed at a predetermined position in the store. The clerk terminal 300 receives the alert from the fraud detection device 10 in the case where the customer's fraudulent behavior such as scan omission of the product is detected by the fraud detection device 10. Note that a plurality of the clerk terminals 300 may exist for respective clerks of the store, but, for example, the terminal to which the alert is notified may be limited to, for example, a terminal possessed by the clerk in charge of security near an exit, or the like.

Figure 2:
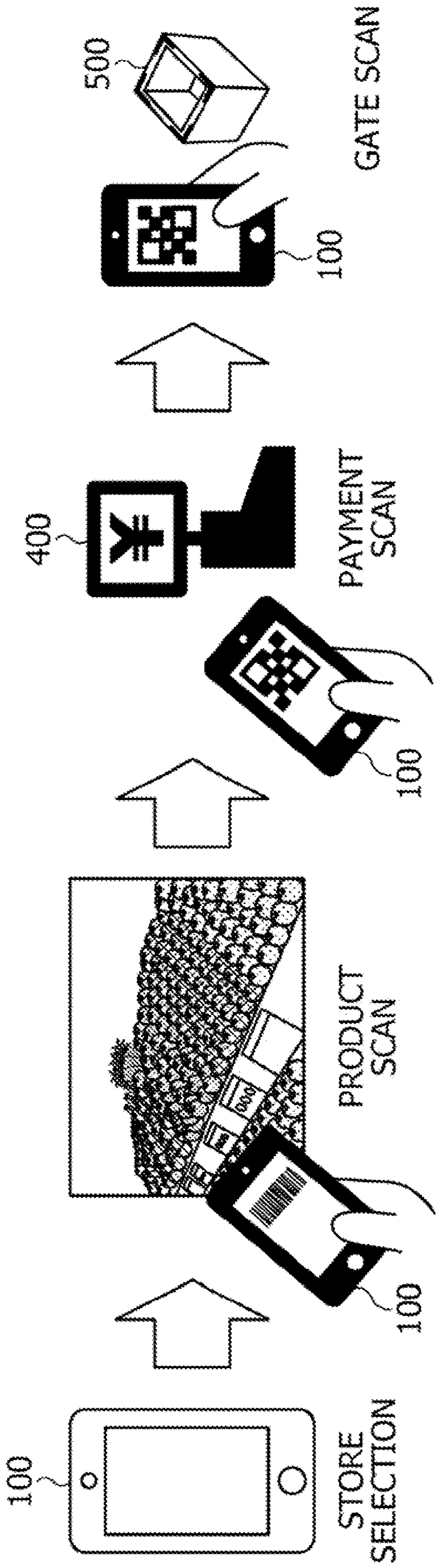
FIG. 2 is a diagram illustrating an example of product purchase by self-scan according to the first embodiment.

Next, a method in which the customer himself/herself scans and registers the product (hereinafter may be referred to as "self-scan") and purchase the product will be described with reference to FIGS. 2 and 3. FIG. 2 is a diagram illustrating an example of product purchase by self-scan according to the first embodiment.

As illustrated in FIG. 2, the customer first selects the store that the customer has visited through an application displayed on the user terminal 100. Next, the customer picks up a product to be purchased and reads, for example, a barcode or the like for each product affixed to the product, a product shelf, or the like using the user terminal 100 (hereinafter may be referred to as "product scan"). Thereby, the product to be purchased is registered in the application.

Next, the customer scans a payment code displayed on a display unit of a self-checkout terminal 400 or the like. Then, purchase of the product is completed by paying the amount displayed on a settlement screen of the self-checkout terminal 400. Furthermore, the customer can go out of the store by having a payment completion code displayed on the user terminal 100 read by a gate reader 500 or the like installed at an exit or the like of the store. Note that the self-checkout terminal 400 and the gate reader 500 are not illustrated in FIG. 1, but they are connected to the fraud detection device 10 to be able to communicate with each other via the network 50.

Next, another example of product purchase by self-scan will be described. FIG. 3 is a diagram illustrating another example of the product purchase by self-scan according to the first embodiment.

Figure 3:
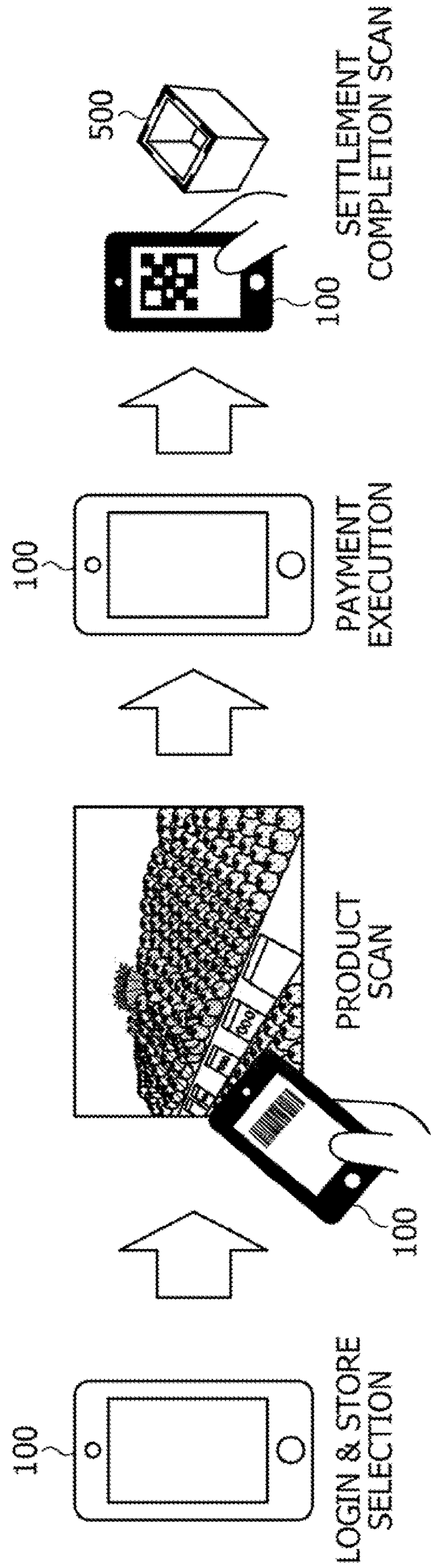
FIG. 3 is a diagram illustrating another example of the product purchase by self-scan according to the first embodiment.

As illustrated in FIG. 3, the customer first logs in to the application displayed on the user terminal 100 and selects the store that the customer has visited. Next, the customer picks up the product to be purchased and reads, for example, the barcode or the like for each product affixed to the product to be purchased, the product shelf, or the like using the user terminal 100.

Next, the customer places the basket containing the product to be purchased at a checkpoint in the store and presses a "checkout button", "purchase button", or the like displayed on the user terminal 100 to perform payment for the product to be purchased. Note that the product to be purchased can be paid by electronic money, a credit card, or the like via an application displayed on the user terminal 100. Then, the customer can go out of the store by having a settlement completion code displayed on the user terminal 100 read by a gate reader 500 or the like installed at an exit or the like of the store.

The product purchase by self-scan has been described above with reference to FIGS. 2 and 3. However, in the self-scan, the customer can put a product in the basket without performing product scan and avoid payment without going through the self-checkout, for example. Alternatively, the customer can avoid paying for some products by scanning only some of the products to be purchased and performing payment for only the scanned products at the self-checkout. In particular, it is easy for the clerk or the like to find the fraudulent behavior in a case where the number of products is small, but, for example, it is difficult for the clerk or the like to find the fraudulent behavior in a case where the number of products is large and some products are not scanned, or the like.

Furthermore, in the case where scan omission of the product is detected by the fraud detection device 10, a product scan action varies depending on the type, size, and the like of the product, so scan omission of the product may not be detected correctly. Furthermore, in the case of detecting scan omission of the product, the following problems may occur. For example, not all the customers perform product scan using the user terminal 100. That is, as in the past, some customers may collectively perform payment at the self-checkout or may perform payment by clerk operating a cash register. For example, the person who did not perform product scan is not necessarily a fraudulent person. Therefore, for example, if only persons who have not performed product scan are detected from the video by the camera device 200, the customer who performs normal payment at the cash register is also detected. Therefore, it is difficult to accurately identify the fraudulent person.

Figure 4:
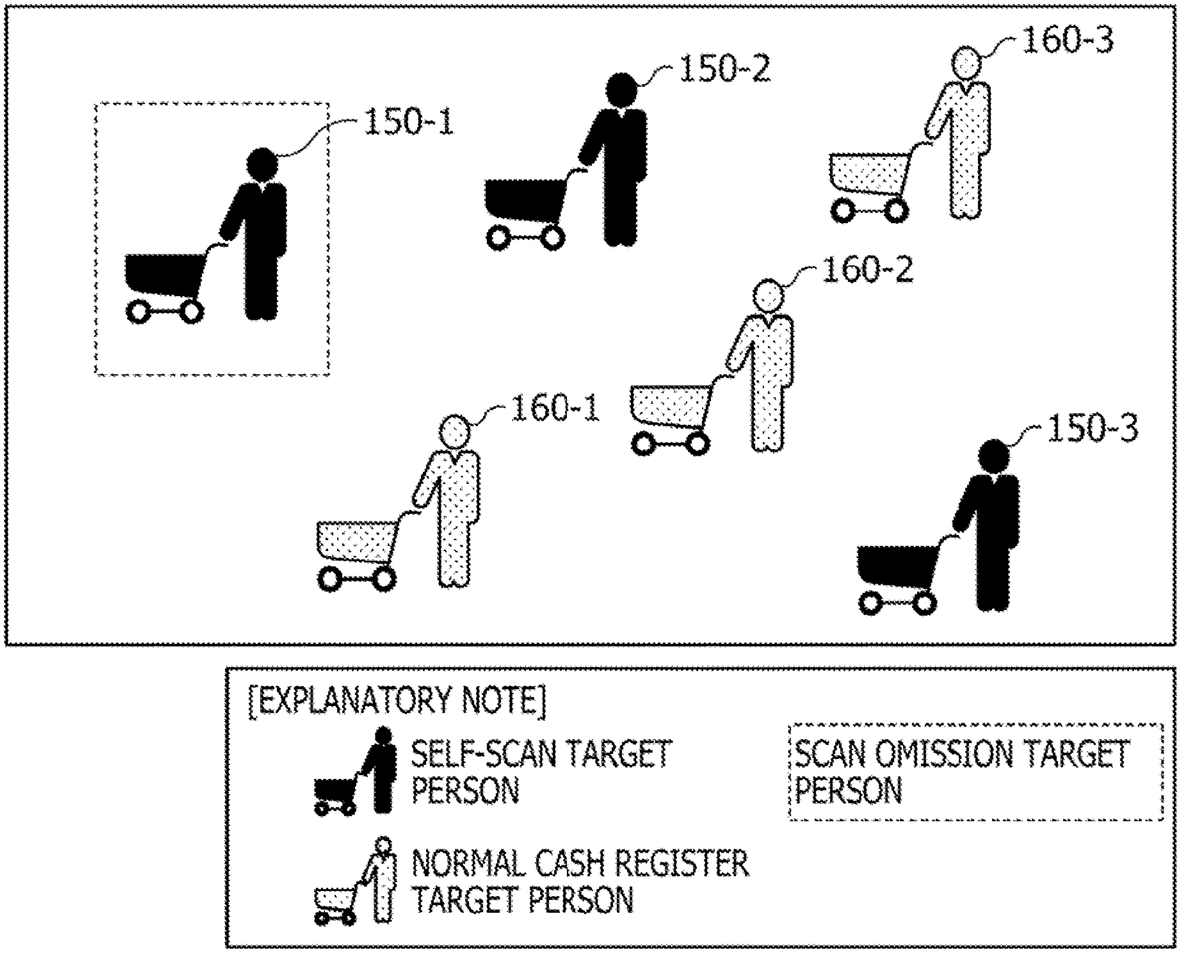
FIG. 4 is a diagram illustrating an example of fraud detection from a captured image according to the first embodiment.

FIG. 4 is a diagram illustrating an example of fraud detection from the captured image according to the first embodiment. FIG. 4 is an example of an image in the store captured by the camera device 200. As illustrated in FIG. 4, in the store, self-scan target persons 150-1 to 150-3 who perform product purchase by self-scan using the user terminals 100 and normal cash register target persons 160-1 to 160-3 who perform product purchase as usual without self-scan may be mixed.

For example, in the example of FIG. 4, only the self-scan target person 150-1 is assumed to be a scan omission target person who does not intentionally perform self-scan. Therefore, as illustrated in FIG. 4, detecting only the self-scan target person 150-1 as a scan omission target person is a correct answer as the fraud detection.

However, in a case where the fraud detection device 10 determines a person who has not performed the action to register the product in the user terminal 100 as the scan omission target person, even the normal cash register target persons 160-1 to 160-3 who do not need to perform the action in the first place are also detected as the scan omission target persons.

Furthermore, in the case of detecting a person who has not performed product scan from the video of the camera device 200, an amount of information transmitted to the fraud detection device 10 and an amount of information to be processed increase, which may cause a problem of an increase in a processing load. Therefore, one of purposes of the present embodiment is to improve the accuracy of detecting a fraudulent behavior at the time of product purchase by self-scan while solving such a problem.

[Functional Configuration of Fraud Detection Device 10]

Figure 5:
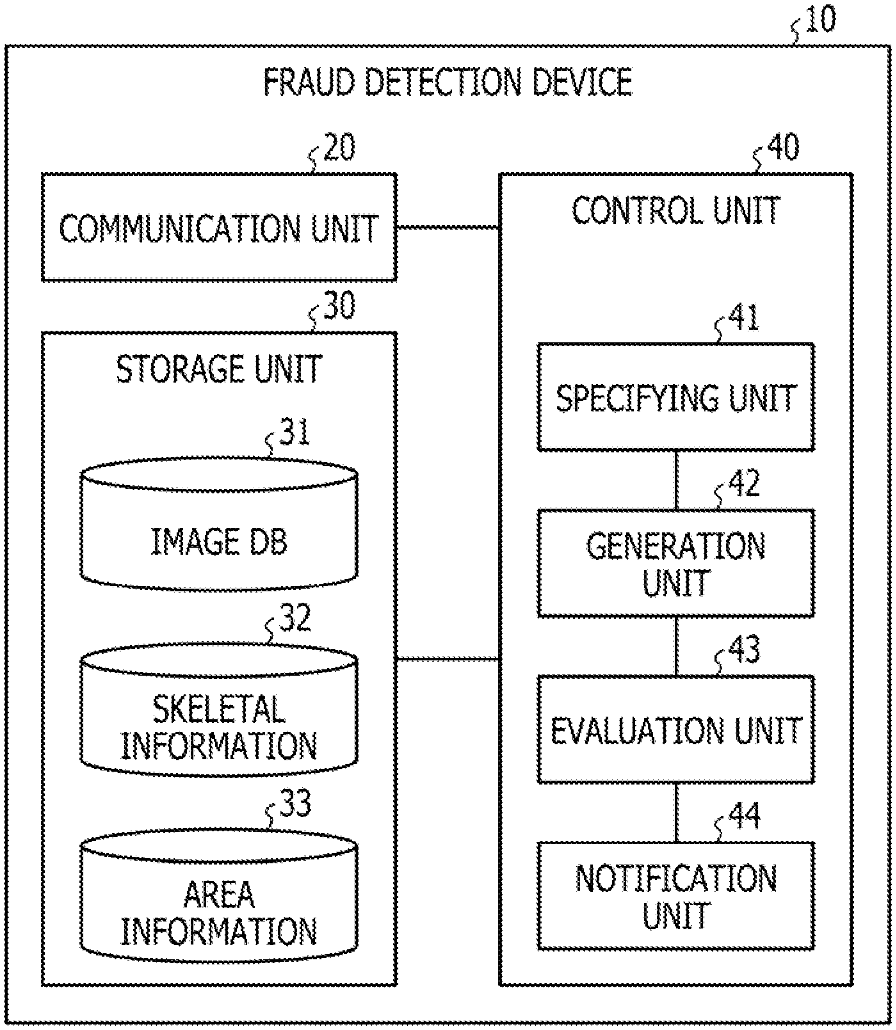
FIG. 5 is a diagram illustrating a configuration example of a fraud detection device 10 according to the first embodiment.

Next, a functional configuration of the fraud detection device 10 will be described. FIG. 5 is a diagram illustrating a configuration example of the fraud detection device 10 according to the first embodiment. As illustrated in FIG. 5, the fraud detection device 10 includes a communication unit 20, a storage unit 30, and a control unit 40.

The communication unit 20 is a processing unit that controls communication with another device such as the user terminal 100 or the camera device 200, and is, for example, a communication interface such as a universal serial bus (USB) interface or a network interface card.

The storage unit 30 has a function to store various data and a program executed by the control unit 40, and is implemented by, for example, a storage device such as a memory or a hard disk. The storage unit 30 stores an image database (DB) 31, skeletal information 32, area information 33, and the like.

The image DB 31 stores a plurality of captured images, which is a series of frames captured by the camera device 200. Furthermore, the image DB 31 can store positional information in the image of a person or an object specified for the captured image.

The skeletal information 32 stores skeletal information of the person specified from the captured image captured by the camera device 200. Generation of the skeletal information will be described below.

The area information 33 stores information regarding a product sales area (hereinafter may be simply referred to as an "area") such as a product sales floor or shelf. FIG. 6 is a diagram illustrating an example of data stored in the area information 33 according to the first embodiment. As illustrated in FIG. 6, the area information 33 stores, an "area" that is an identifier for uniquely identifying the area, "area coordinates" that indicate the positional information of the area, an "area division" that indicates a division of the area, and the like in association with one another.

Here, the sales area may be a large area in units of sales floor or a small area such as one shelf of the product shelf. Furthermore, in the "area coordinates", for example, the positional information of pixels in the captured image captured by the camera device 200 may be set, as illustrated in FIG. 6. In the example of FIG. 6, each area may be within a range indicated by a rectangle connecting four points indicated by the "area coordinates". Furthermore, in the "area division", a character string or a numerical value indicating the type, size, or price range of the product sold in the area may be set.

Note that the above-described information stored in the storage unit 30 is merely an example, and the storage unit 30 can store various types of information other than the above-described information.

The control unit 40 is a processing unit that controls the entire fraud detection device 10 and is, for example, a processor or the like. The control unit 40 includes a specifying unit 41, a generation unit 42, an evaluation unit 43, and a notification unit 44. Note that each processing unit is an example of an electronic circuit included in a processor or an example of a process performed by the processor.

The specifying unit 41 specifies a person staying in the store and an object used by the person from the captured image captured by the camera device 200. The object may include, for example, not only the basket, the product, and the user terminal 100, but also the sales area where the person is staying, such as the sales floor or the shelf of the product. Note that the processing of specifying the person may include processing of tracking the same person at different times on the basis of an appearance and an amount of movement of the person from the captured images captured at different times. Furthermore, the processing of specifying the area where the person is staying may include processing of specifying the sales area where the target person is staying by using the positional information between the person in the captured image and the sales floor or shelf of the product.

Furthermore, the specifying unit 41 specifies setting information associated with the specified area. The setting information may be, for example, the "area division" of the area information 33 or the like.

Furthermore, the specifying unit 41 detects and specifies the action of the person taking out the product from the shelf containing the product on the basis of the specified object and the skeletal information generated by the generation unit 42. Furthermore, the specifying unit 41 detects and specifies the action of the person putting the taken-out product into the basket and the action of the person registering the product to be purchased to the user terminal 100. Note that the specifying unit 41 may limit the specification of each action to only the self-scan target person who possesses the user terminal 100 by specifying the user terminal 100 possessed by the person.

Here, the processing of specifying the action to take out the product may include, for example, processing of specifying a taking action in a case where after the person's hand enters an area of the product shelf or the like, the person takes a posture of standing, crouching, or bending down, and turns the arm including the hand forward, and the hand is moving at a predetermined speed or higher.

Furthermore, the processing of specifying the action to put the product in the basket may include, for example, processing of specifying a basket-insertion action in a case where the person's hand moves in and moves out of the specified basket area while moving at a predetermined speed or higher on the basis of the specified object and skeletal information.

Furthermore, the processing of specifying the action to register the product to be purchased may include processing of specifying a product registration action in a case where the person's hand enters a predetermined range of an area on the image of the specified basket, and the arm including the hand is turned forward and does not move for a predetermined time on the basis of the specified object and skeletal information. Furthermore, in another example, the processing of specifying the product registration action may include processing of specifying the product registration action in a case where at least a right hand or a left hand is put forward, the distance between the either hand and an area on the image of the specified user terminal 100 is short within a predetermined distance, and both hands are stopped for a fixed time. In yet another example, the processing of specifying the product registration action may include processing of specifying the product registration action in a case where the distance between the hand and the area of the user terminal 100 is short, and moreover the distance between the area of the user terminal 100 and a region of interest (ROI) for barcode for the product is short. Note that the ROI for barcode is an area indicating the location of the barcode for product registration in the captured image, and is set in advance. Furthermore, the distance to each area being short means that the distance to center coordinates of the area in the image is short, for example.

The generation unit 42 generates the skeletal information of the person specified by the specifying unit 41 from the captured image captured by the camera device 200.

The evaluation unit 43 changes a parameter for evaluating a behavior of the person for the product on the basis of the setting information specified by the specifying unit 41. The processing of changing a parameter may include processing of changing a parameter for a speed of the action to take out the product from the product shelf or the like or the action to put the product in the basket. The processing of changing a parameter may include processing of changing a parameter for a difference in detection times between the action to put the product in the basket and the action to register the product to the user terminal 100, that is, a grace time. For example, in the case of a large product, it is conceivable that it takes time for each action, so the parameters for the speed for each action and for the grace time between actions are changed so as to be handled even if the action is slower than that for the small product.

The evaluation unit 43 evaluates a person's behavior for the product on the basis of each parameter. For example, the evaluation unit 43 may evaluate that the person has performed fraudulence in a case where a time from detecting the action to put the product in the basket to detecting the action to register the product to the user terminal 100 is not within the grace time set by the parameter, for example, not within ten seconds.

Furthermore, the processing of evaluating a person's behavior includes processing of weighting and evaluating a behavior on the basis of, for example, the area where the person is staying when detecting a specific action such as the action to put the product in the basket, or the age, gender, and the like of the person. For example, by weighting and evaluating a behavior in a case where the area where the person is staying is a high-priced product sales floor when detecting the action to put the product in the basket or in a case of a teenage man or the like having a relatively high frequency of fraudulent behavior, evaluation criteria can be tightened and the fraudulent behavior can be easily detected. On the contrary, in a case of an age group, for example, in which the frequency of fraudulent behavior is low, the weighting and evaluation may be performed so as to relax the evaluation criteria.

The notification unit 44 notifies the clerk terminal 300 of an alert in a case where the person is determined to have performed fraudulence by the evaluation of the behavior by the evaluation unit 43. Note that the alert notification may be an output of a message, voice, or the like. Furthermore, the notification unit 44 can transmit information for specifying the person who has performed fraudulence, for example, the captured image of the person who has performed fraudulence to the clerk terminal 300 together with the alert notification. Note that, in a case where a plurality of persons appears in the captured image, the notification unit 44 may process the captured image so that the person who has performed fraudulence can be easily specified, such as surrounding the person who has performed fraudulence with a frame.

[Details of Functions]

Figure 7:
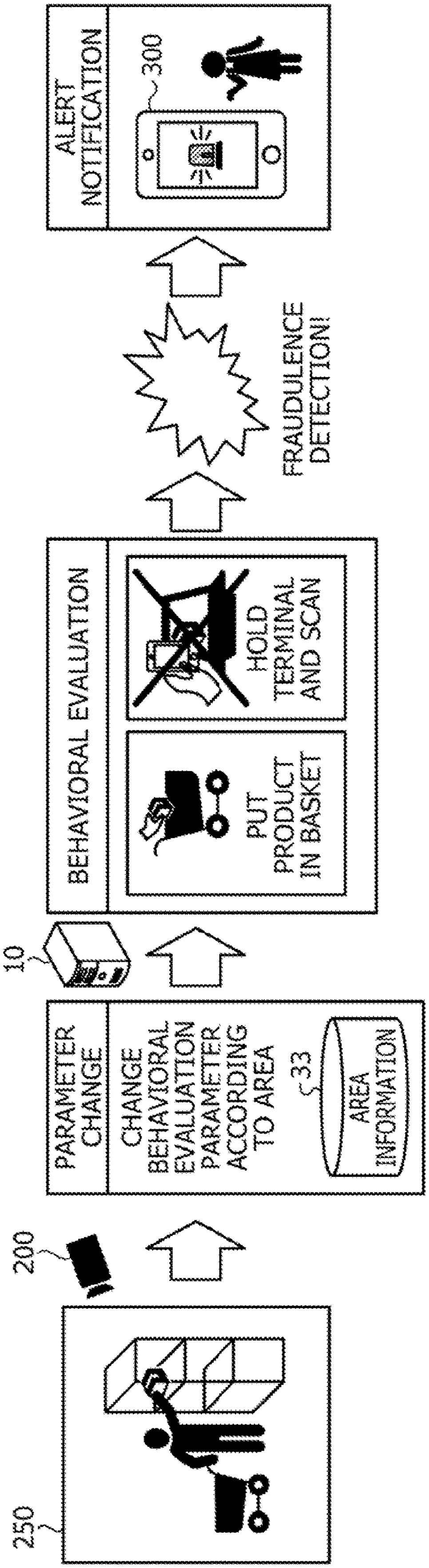
FIG. 7 is a diagram illustrating an example of fraud detection processing according to the first embodiment.

Next, fraud detection processing executed by the fraud detection device 10 as an operation subject will be described in detail with reference to FIGS. 7 to 14. FIG. 7 is a diagram illustrating an example of fraud detection processing according to the first embodiment. A captured image 250 illustrated in FIG. 7 is an example of the captured image in the store of the retail store captured by the camera device 200. The fraud detection device 10 specifies a person or an object from the captured image 250. The object specification from the captured image 250 will be described with reference to FIG. 8.

Figure 8:
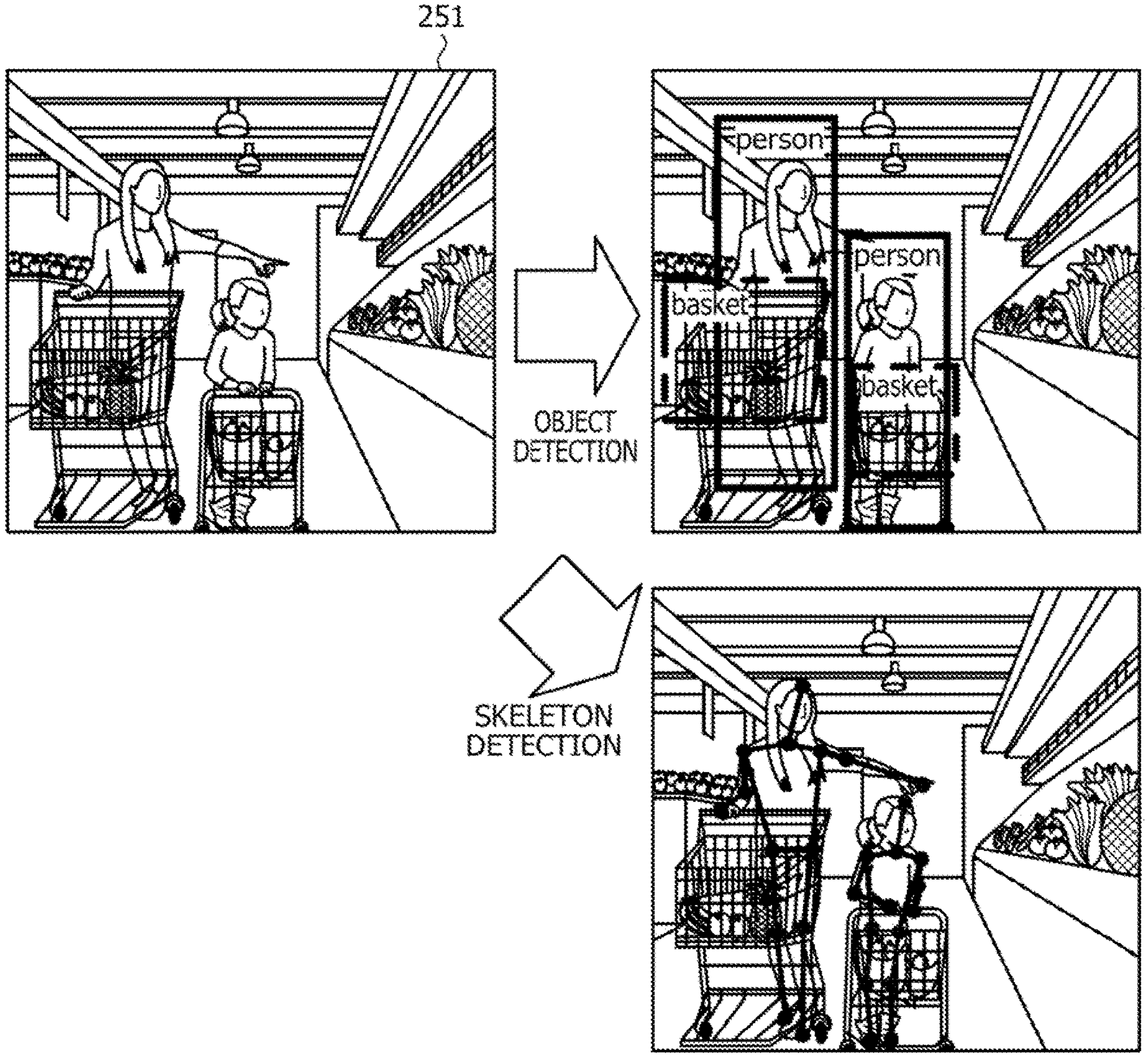
FIG. 8 is a diagram illustrating an example of object detection and skeleton detection according to the first embodiment.

FIG. 8 is a diagram illustrating an example of object detection and skeleton detection according to the first embodiment. As illustrated in the upper right of FIG. 8, the fraud detection device 10 detects and specifies the person or the basket from a captured image 251 by using, for example, an existing object detection algorithm. Here, the existing object detection algorithm is, for example, an object detection algorithm using deep learning such as Faster R-convolutional neural network (CNN). Furthermore, an object detection algorithm such as You Only Look Once (YOLO) or Single Shot Multibox Detector (SSD) may be used.

Furthermore, in addition to the person and the basket, for example, the product, the user terminal 100, the sales area of the product such as the sales floor or the shelf of the product, clothes of the person, and the like may be detected from the captured image. Thereby, the fraud detection device 10 can detect that, for example, the user terminal 100 is held but the self-scan is not performed. Furthermore, the fraud detection device 10 can determine, for example, which sales area the person is staying and trying to purchase the product. Furthermore, the fraud detection device 10 can exclude, for example, a person who does not possess the user terminal 100 or a person who wears a clerk's uniform from the target for the fraud detection processing. In this way, the fraud detection device 10 can reduce a processing load by excluding the persons who do not need to perform fraud detection from the processing target.

Furthermore, the fraud detection device 10 can determine, for example, the age of the persons specified from the captured image by an existing algorithm, and can also specify a group relationship such as a parent-child relationship between the persons. Thereby, for example, in the case of a parent-child relationship, if either one of the target persons performs product scan, it may be determined that the scan omission of the product has not occurred.

Furthermore, as illustrated in the lower right of FIG. 8, the fraud detection device 10 detects a skeleton of the person specified from the captured image 251 by using, for example, an existing skeleton estimation algorithm. Here, the existing skeleton estimation algorithm is, for example, a skeleton estimation algorithm using deep learning such as HumanPoseEstimation such as DeepPose or OpenPose.

Figure 20:
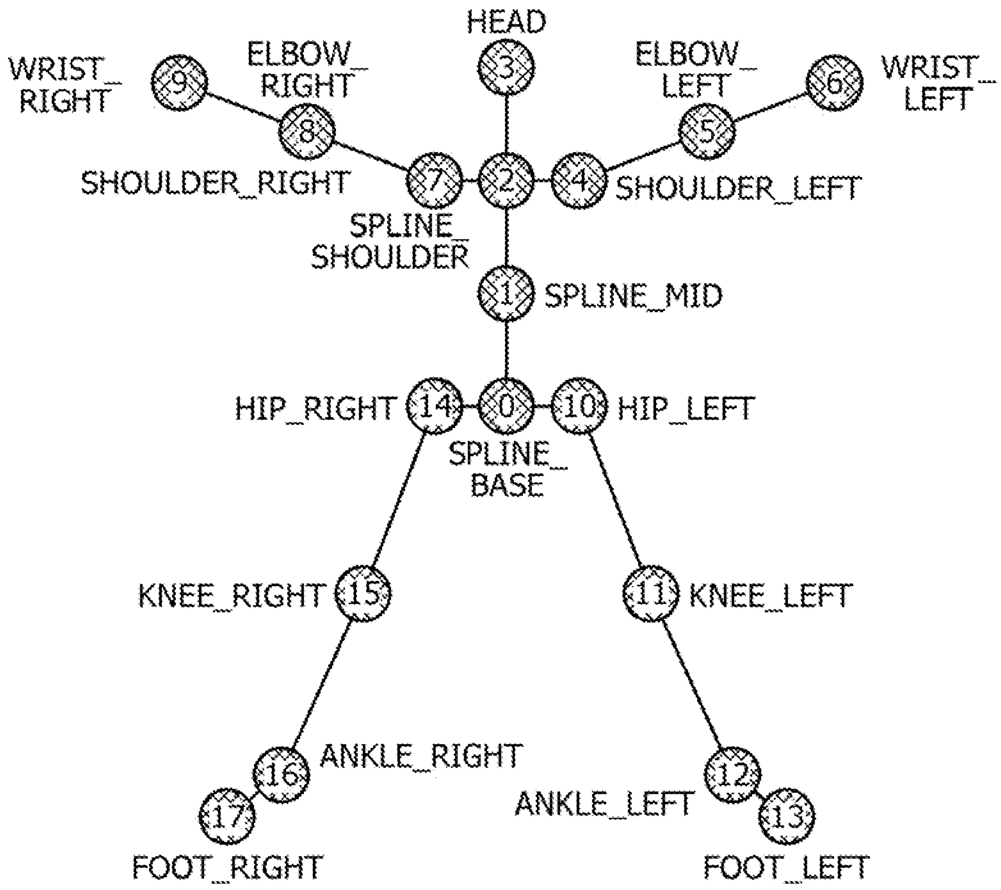
FIG. 20 is a diagram illustrating an example of skeletal information.

For example, the fraud detection device 10 acquires the skeletal information by inputting image data (each of frames) into a trained machine learning model. FIG. 20 is a diagram illustrating an example of the skeletal information. As the skeletal information, eighteen pieces (numbers 0 to 17) of definition information in which respective joints specified in a known skeleton model are numbered can be used. For example, a right shoulder joint (SHOULDER_RIGHT) is assigned with number 7, a left elbow joint (ELBOW_LEFT) is assigned with number 5, a left knee joint (KNEE_LEFT) is assigned with number 11, and a right hip joint (HIP_RIGHT) is assigned with number 14. Therefore, the fraud detection device 10 can acquire coordinate information of the eighteen skeletons illustrated in FIG. 20 from the image data. For example, the fraud detection device 10 acquires "X coordinate=X7, Y coordinate=Y7, Z coordinate=Z7" as the position of the right shoulder joint of number 7. Note that, for example, a Z axis may be defined as a distance direction from the imaging device toward an object, a Y axis may be defined as a height direction perpendicular to the Z axis, and an X axis may be defined as a horizontal direction.

Figure 21:
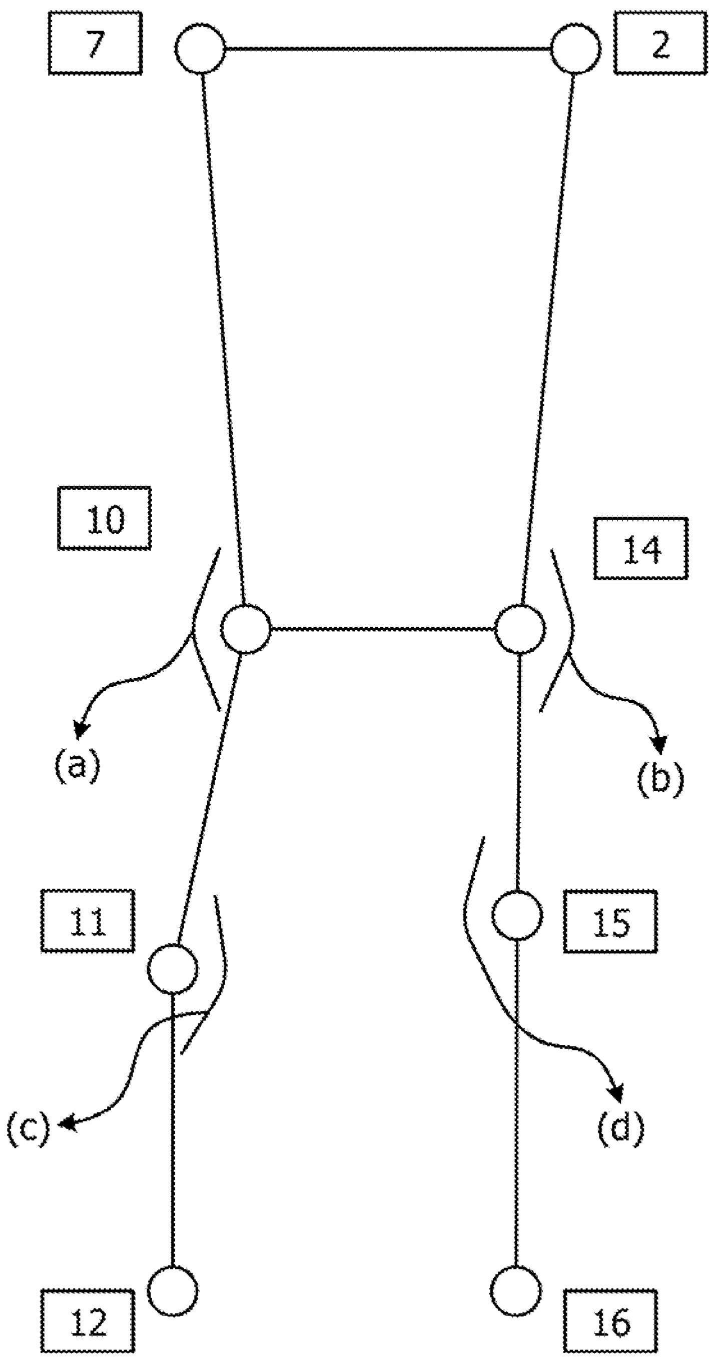
FIG. 21 is a diagram for describing posture determination of a whole body.

Furthermore, the fraud detection device 10 can also determine a posture of a whole body such as standing, walking, crouching, sitting, or sleeping by using a machine learning model in which a pattern of the skeleton is trained in advance. For example, the fraud detection device 10 can determine the closest whole body posture by using a machine learning model in which an angle between some joints is trained by Multilayer Perceptron, such as the skeletal information and aesthetics diagram in FIG. 20. FIG. 21 is a diagram for describing posture determination of the whole body. As illustrated in FIG. 21, the fraud detection device 10 can detect the posture of the whole body by acquiring a joint angle (a) between "HIP_LEFT" of number 10 and "KNEE_LEFT" of number 11, a joint angle (b) between "HIP_RIGHT" of number 14 and "KNEE_RIGHT" of number 15, an angle (c) of "KNEE_LEFT" of number 11, an angle (d) of "KNEE_RIGHT" of number 15, and the like.

Furthermore, the fraud detection device 10 may estimate the posture using a machine learning model such as Multi Layer Perceptron, which is generated by machine learning using the angles between some joints as feature amounts, and the postures of the whole body such as standing and crouching as correct answer labels.

Furthermore, the fraud detection device 10 may use 3D Pose estimation such as VNect, which estimates a three-dimensional posture from one captured image, as the posture estimation algorithm. Furthermore, the fraud detection device 10 may estimate the posture from three-dimensional joint data by using, for example, 3d-pose-baseline that generates three-dimensional joint data from two-dimensional skeletal information.

Furthermore, the fraud detection device 10 may specify the action of each part on the basis of an orientation of each part such as the face, arm, or elbow, of the person, an angle when bent, and the like, and estimate the posture of the person. Note that the posture estimation and the skeleton estimation algorithm are not limited to one type, and the posture and skeleton may be estimated in a complex manner using a plurality of algorithms.

Figure 9:
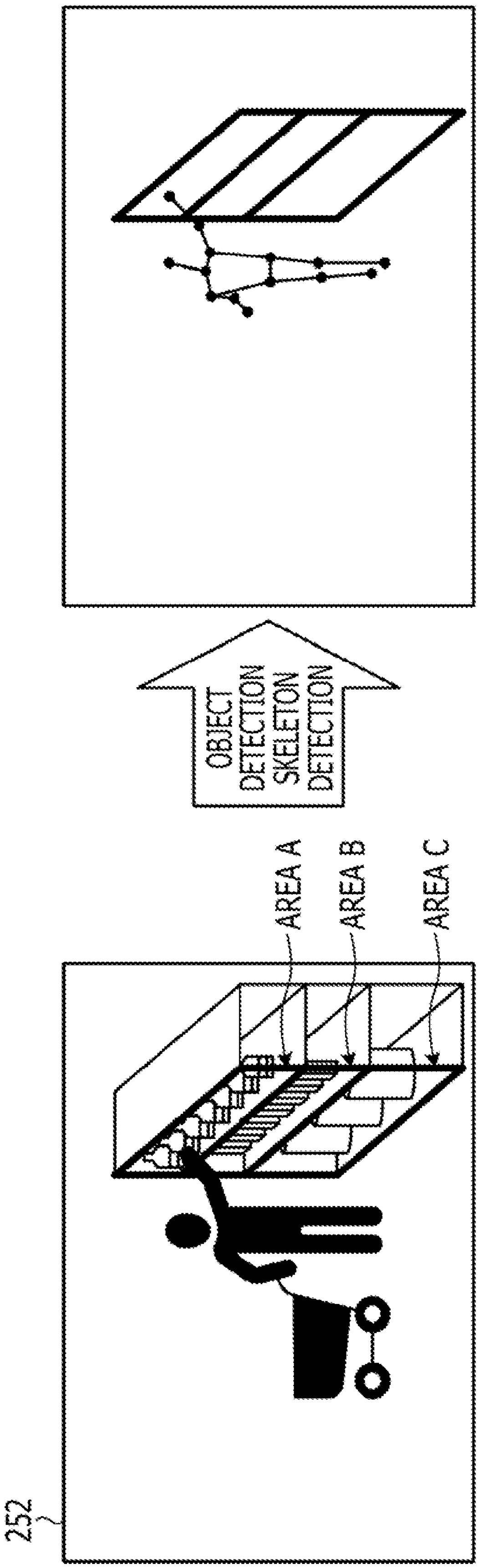
FIG. 9 is a diagram illustrating an example of specifying a product take-out action according to the first embodiment.

FIG. 9 is a diagram illustrating an example of specifying a product take-out action according to the first embodiment. As illustrated in FIG. 9, the fraud detection device 10 detects, for example, the skeletal information of areas A, B, and C and the person from a captured image 252. The areas A, B, and C are areas of individual shelves of product shelves in the example of FIG. 9, but may be larger areas such as, for example, the units of sales floor. Each area may be specified on the basis of, for example, the positional information of pixels in the captured image, which is preset in the "area coordinates" of the area information 33.

Then, the fraud detection device 10 specifies the person's action to take out the product from the shelf containing the product on the basis of the specified each area and the skeletal information of the person. More specifically, the fraud detection device 10 specifies the action to take out the product placed in the area A in a case where, for example, after the person's hand enters the area A, the person takes a posture of standing, crouching, or bending down, and turns the arm including the hand forward, and the hand is moving at a predetermined speed or higher. Here, it can be determined that the hand is moving at a predetermined speed or higher, for example, from the movement of the hand specified from each of the continuously captured images, that is, the amount of movement. Furthermore, the fraud detection device 10 can determine, for example, the movement of each product specified from the captured image and the skeleton of the fingers, and further specify a further detailed action such as whether the product was taken out and moreover, which product has been taken out.

Figure 10:
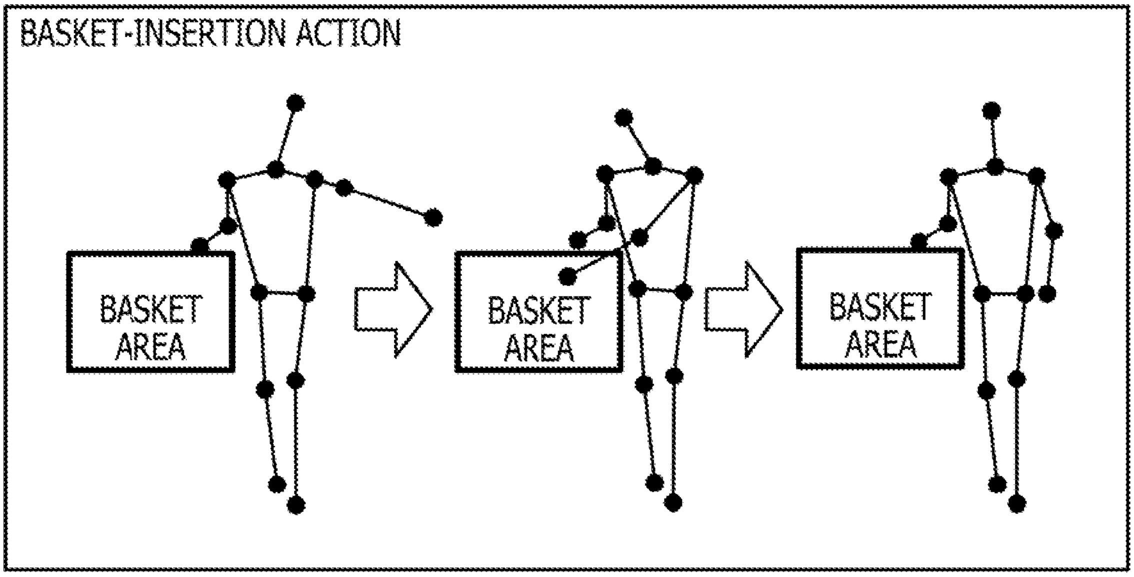
FIG. 10 is a diagram illustrating an example of specifying a basket-insertion action according to the first embodiment.

FIG. 10 is a diagram illustrating an example of specifying the basket-insertion action according to the first embodiment. As illustrated in FIG. 10, the fraud detection device 10 specifies the person's action to put the product in the basket in a case where, for example, the person's hand has moved in and moved out of the area of the specified basket while moving at a predetermined speed or higher. Furthermore, the fraud detection device 10 can determine, for example, the movement of each product specified from the captured image and the skeleton of the fingers, and specify a further detailed action such as which product has been put in the basket.

Figure 11:
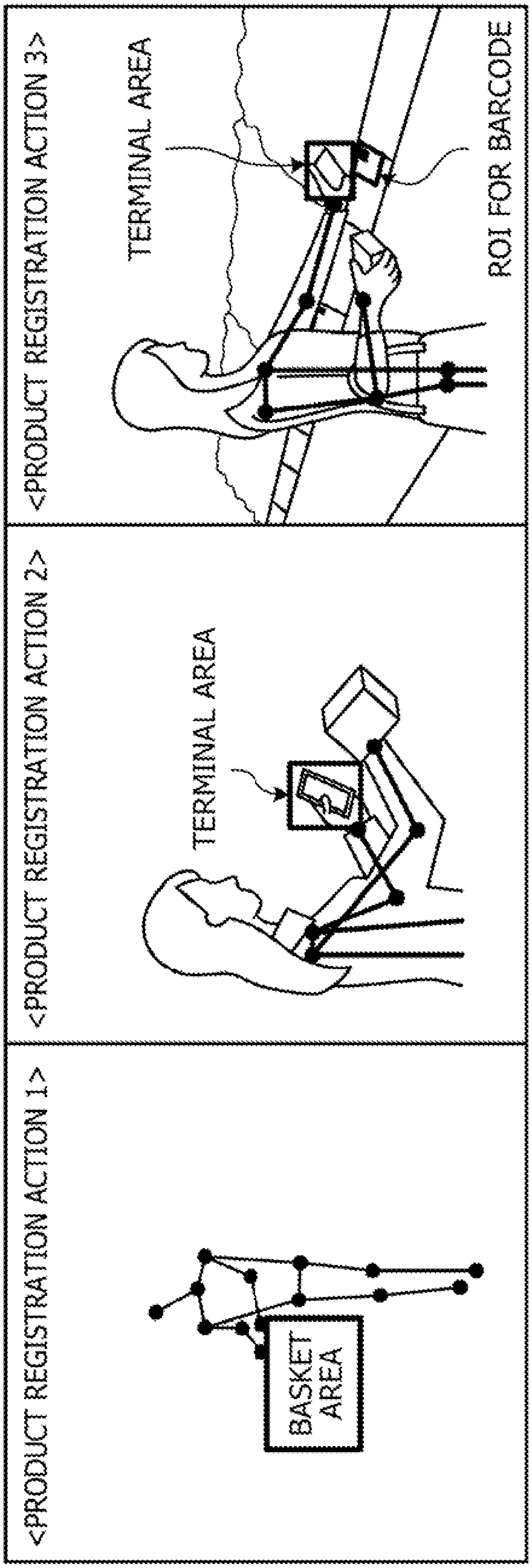
FIG. 11 is a diagram illustrating an example of specifying a product registration action according to the first embodiment.

FIG. 11 is a diagram illustrating an example of specifying the product registration action according to the first embodiment. FIG. 11 illustrates three specified product registration actions as examples. For example, as illustrated in FIG. 11 as a product registration action 1, the fraud detection device 10 specifies the person's action to register the product to be purchased to the user terminal 100 in a case where both elbows of the person are bent forward and do not move for a predetermined time within a predetermined range of the specified basket area.

Furthermore, as illustrated in FIG. 11 as a product registration action 2, the product registration action is specified in the case where at least the right hand or the left hand is put forward, the distance between the either hand and the area on the image of the specified user terminal 100 is short within a predetermined distance, and both hands are stopped for a fixed time.

Furthermore, as illustrated in FIG. 11 as a product registration action 3, the product registration action is specified in a case where the distance between the hand and the area of the user terminal 100 is short within a predetermined distance, and moreover, the distance between the area of the user terminal 100 and the ROI for barcode for the product is short within a predetermined distance. Furthermore, the fraud detection device 10 can detect, for example, a barcode surface of each product and specify a further detailed action such as which product has been registered, for example.

Note that, when specifying each action, the fraud detection device 10 can reduce the processing load by generating and processing the skeletal information with a smaller amount of information from the captured image instead of directly processing the captured image.

Returning to the description of FIG. 7, the fraud detection device 10 specifies the person or the object from the captured image 250, and specifies the product take-out action, the basket-insertion action, and the product registration action of the specified person, as described with reference to FIGS. 8 to 11. Furthermore, the fraud detection device 10 specifies the area where the person is staying when detecting each action from the captured image 250, and changes the parameter for evaluating the behavior of the person for the product according to the specified area. The changing the parameter is, for example, changing the parameter for the action speed for specifying each action, or the parameter for the grace time between actions. The change of each parameter will be described with reference to FIG. 12.

FIG. 12 is a diagram illustrating an example of parameter change according to the first embodiment. The fraud detection device 10 changes the parameter for evaluating the person's behavior for the product on the basis of the setting information associated with the specified area. The "area", "area coordinates", and "shelf division" illustrated in FIG. 12 are the same information as the area information 33 illustrated in FIG. 6, and are information associated with areas that can be specified as the respective areas where the person is staying by the fraud detection device 10.

Meanwhile, "speed X for taking the product from the shelf", "speed Y for putting the product in the basket", and "time T until product registration" are the parameters for evaluating the person's behavior for the product. The "speed X for taking the product from the shelf" and the "speed Y for putting the product in the basket" are, for example, threshold values of the amount of movement of a hand in the captured images continuously captured. For example, the fraud detection device 10 determines that the action of the hand is the action to take the product from the shelf or the action to put the product in the basket in the case where the hand is moving at a speed of the threshold value or higher and another condition of each action is satisfied. For example, even if the condition of each action is satisfied, in the case where the speed of the hand is less than the threshold value, the action of the hand is not determined as each action. As illustrated in FIG. 12, the "speed X for taking the product from the shelf" and the "speed Y for putting the product in the basket" are set for each area, and are changed according to the specified area when evaluating the person's behavior.

In this way, the fraud detection device 10 can suppress erroneous detection of an unnecessary action and continuation of unnecessary processing and reduce the processing load while improving the detection accuracy of each action. Note that the set values of the "speed X for taking the product from the shelf" and the "speed Y for putting the product in the basket" in FIG. 12 are an example, and upper limits may be set instead of the lower limits of the threshold values. In this case, the action of the hand is determined to be the action to take the product from the shelf or the action to put the product in the basket in the case where the hand is moving at a speed within the upper limit and another condition of each action is satisfied.

The "time T until product registration" is, for example, a threshold value of the time (seconds) from when the product is put in the basket to when the product is registered in the user terminal 100. For example, the fraud detection device 10 evaluates that the person has performed fraudulence in a case where the time from when detecting the action to put the product in the basket to when detecting the action to register the product in the user terminal 100 exceeds the "time T until product registration". Note that there may be a case where the product is put in the basket after the product is registered in the user terminal 100, but in this case, the time until the action to register the product is a minus time and thus does not exceed the "time T until product registration", and the person is not evaluated to have performed fraudulence.

Note that the threshold values set for the "speed X for taking the product from the shelf", the "speed Y for putting the product in the basket", and the "time T until product registration" may be adjusted by machine learning or the like on the basis of actual actions of the customer. For example, in the example of FIG. 12, fifteen seconds is set for the "time T until product registration" in the area C, but, for example, if there is a certain number of cases where the action takes fifteen seconds or more as a result of detecting the actual action of each customer, the threshold value may be adjusted to a value such as twenty seconds or twenty-five seconds.

Figure 13:
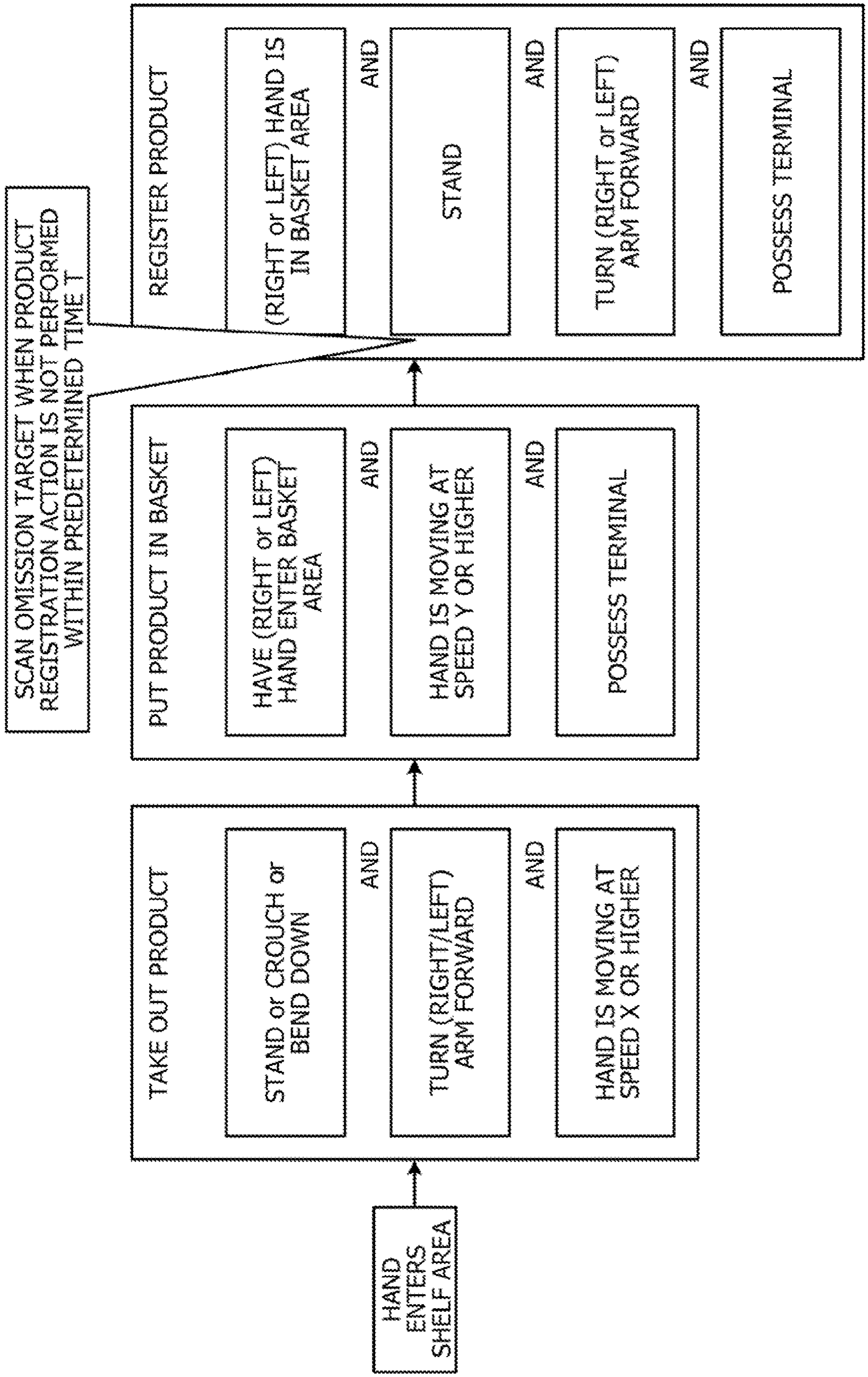
FIG. 13 is a diagram illustrating an example of behavioral evaluation according to the first embodiment.

Returning to the description of FIG. 7, the fraud detection device 10 changes each parameter for evaluating the person's behavior for the product according to the identified area, as described with reference to FIG. 12. Then, the fraud detection device 10 evaluates the person's behavior for the product on the basis of each parameter and each action of the person specified from the captured image 250. FIG. 13 is a diagram illustrating an example of behavioral evaluation according to the first embodiment.

An example of the behavioral evaluation illustrated in FIG. 13 is to determine the person's action in the captured image in four stages and evaluate the person's behavior. First, as the first stage, the fraud detection device 10 determines whether the person's hand in the captured image is in a predetermined area indicating the product shelf, using the product shelf identified from the skeletal information of the person and the captured image.

Next, in the case where the person's hand is in the area of the product shelf, as the second stage, the fraud detection device 10 determines whether the person has taken out the product from the product shelf, using the skeletal information of the person and the product shelf specified from the captured image. Regarding the determination as to whether the product has been taken out, for example, the fraud detection device 10 determines that the person has taken out the product from the product shelf in a case where the person takes a posture of standing, crouching, or bending down, and turns the arm including the hand that has entered the area of the product shelf forward, and the hand is moving at a predetermined speed X or higher.

Next, in the case where the person has taken out the product from the product shelf, as the third stage, the fraud detection device 10 determines whether the person has put the taken-out product in the basket, using the skeletal information of the person and the basket specified from the captured image. Regarding the determination as to whether the product has been put in the basket, the fraud detection device 10 determines the person has put the product in the basket in the case where, for example, the person's hand has moved in and moved out of the area of the specified basket while moving at the predetermined speed Y or higher. Furthermore, the distance between the person's hand and the area of the user terminal 100 being short within a predetermined distance, and the person possessing the user terminal 100 may be set as one of the conditions for determining whether the person has put the taken-out product in the basket, using the user terminal 100 specified from the captured image.

Next, in the case where the person has put the product in the basket, as the fourth stage, the fraud detection device 10 determines whether the person has scanned the product put in the basket and register the product to the user terminal 100, using the skeletal information of the person and the basket specified from the captured image. Regarding the determination as to whether the product has been registered, for example, in the case where the person takes a posture of standing and turns the arm forward, and the hand is in the specified basket area, the fraud detection device 10 determines that the person has registered the product to the user terminal 100. Furthermore, even in this case, the person possessing the user terminal 100 may be set as one of the conditions for determining the action.

Then, in a case where it is determined that the action to register the product to the user terminal 100 is not performed within the predetermined time T after the person puts the product in the basket, the fraud detection device 10 determines that the person is the scan omission target person, and notifies the clerk terminal 300 of the alert. Note that, in the example of FIG. 13, the person's action is determined in four stages, but determination in the number of stages less or more than the four stages may be performed. Furthermore, the fraud detection device 10 may specify person attributes such as the age and gender of the person from the captured image 250, and weight and evaluate the behavior on the basis of the specified person attributes.

Furthermore, as illustrated in FIG. 13, by performing the behavioral evaluation of the person in stages, the fraud detection device 10 does not need to execute the subsequent processing in a case where the determination condition of each stage is not satisfied, and can reduce the processing load. Such stepwise determination processing is suitable for the present embodiment having a possibility of increasing the determination conditions for evaluating the fraudulent behavior of the customer and increasing the amount of processing for detecting the fraudulent behavior, depending on the combination of the number of areas and the customer's behavior, for example.

Figure 14:
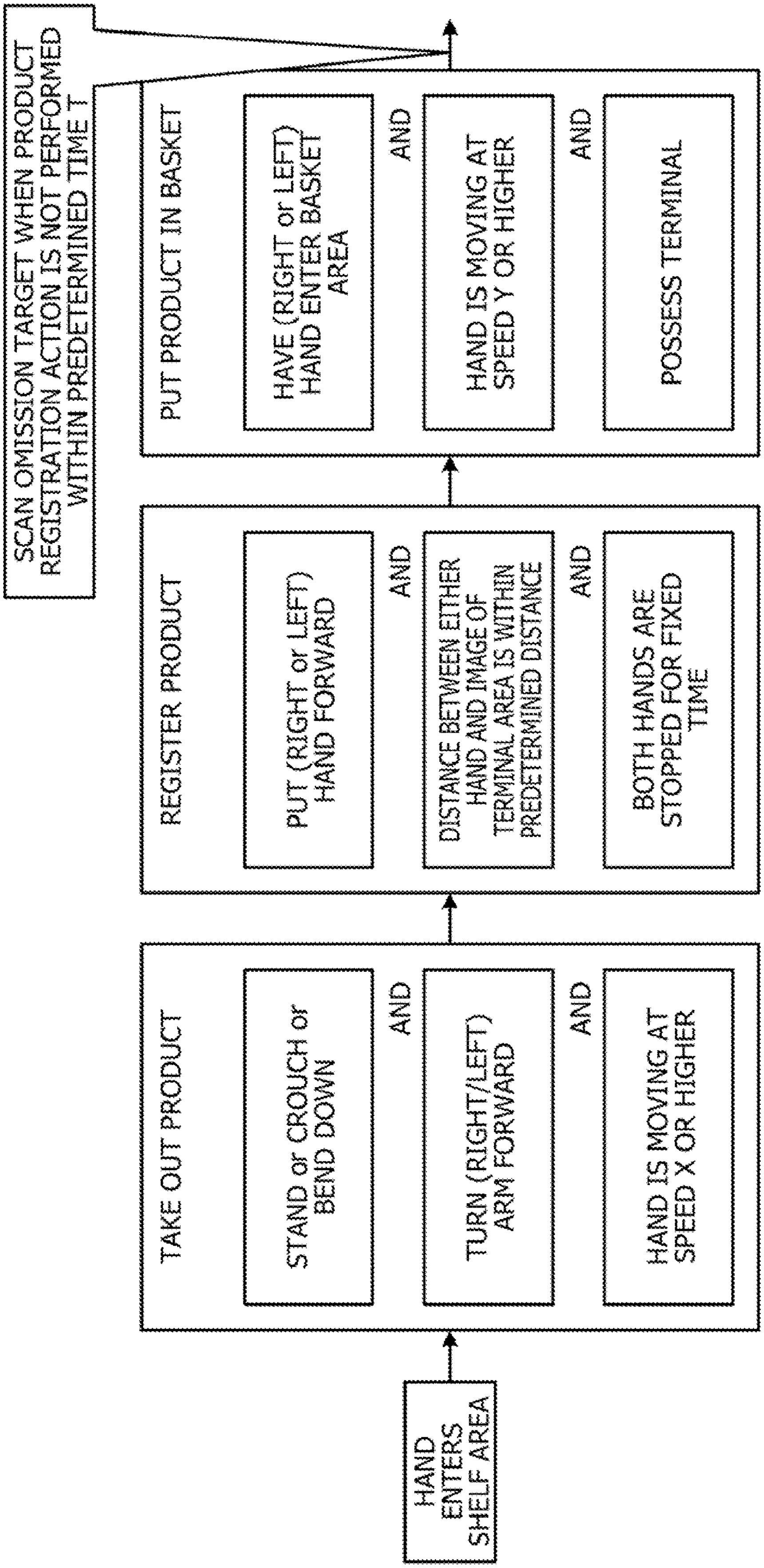
FIG. 14 is a diagram illustrating another example of the behavioral evaluation according to the first embodiment.

Note that the example of FIG. 13 illustrates the pattern of putting the product in the basket and then registering the product to the user terminal 100, but the fraud detection device 10 can perform behavioral evaluation of the pattern of registering the product to the user terminal 100 and then putting the product in the basket. FIG. 14 is a diagram illustrating another example of the behavioral evaluation according to the first embodiment.

Another example of the behavioral evaluation illustrated in FIG. 14 is also to determine the person's action in the captured image in four stages and evaluate the person's behavior, similarly to the example of FIG. 13. The determinations in the first stage and the second stage in the example of FIG. 14 are similar to those of the example of FIG. 13.

Then, in the case where the person has taken out the product from the product shelf, as the third stage, the fraud detection device 10 determines whether the person has scanned the taken-out product and registered the product to the user terminal 100, using the skeletal information of the person and the user terminal 100 specified from the captured image. Regarding the determination as to whether the product has been registered, for example, in the case where at least the right hand or the left hand is put forward, the distance between the either hand and the area on the image of the specified user terminal 100 is short within a predetermined distance, and both hands are stopped for a fixed time, the fraud detection device 10 determines that the person has registered the product.

Next, in the case where the person has registered the product to the user terminal 100, as the fourth stage, the fraud detection device 10 determines whether the person has put the taken-out product in the basket, using the skeletal information of the person and the basket specified from the captured image. The determination condition for the basket-insertion action of the product in the fourth stage is similar to the determination condition of the basket-insertion action illustrated in the third state of FIG. 13, for example.

Then, in the case where it is determined that the action to register the product to the user terminal 100 is not performed within the predetermined time T after the person puts the product in the basket, the fraud detection device 10 determines that the person is the scan omission target person, and notifies the clerk terminal 300 of the alert. The determination condition of the scan omission target may be similar to the determination condition of FIG. 13. This is because, in the pattern of registering the product to the user terminal 100 and then putting the product in the basket as illustrated in FIG. 14, the time from detection of the basket-insertion action of the product to detection of the product registration action becomes a minus time, but the condition of within the predetermined time T is satisfied in the case of the minus time.

[Flow of Processing]

Figure 15:
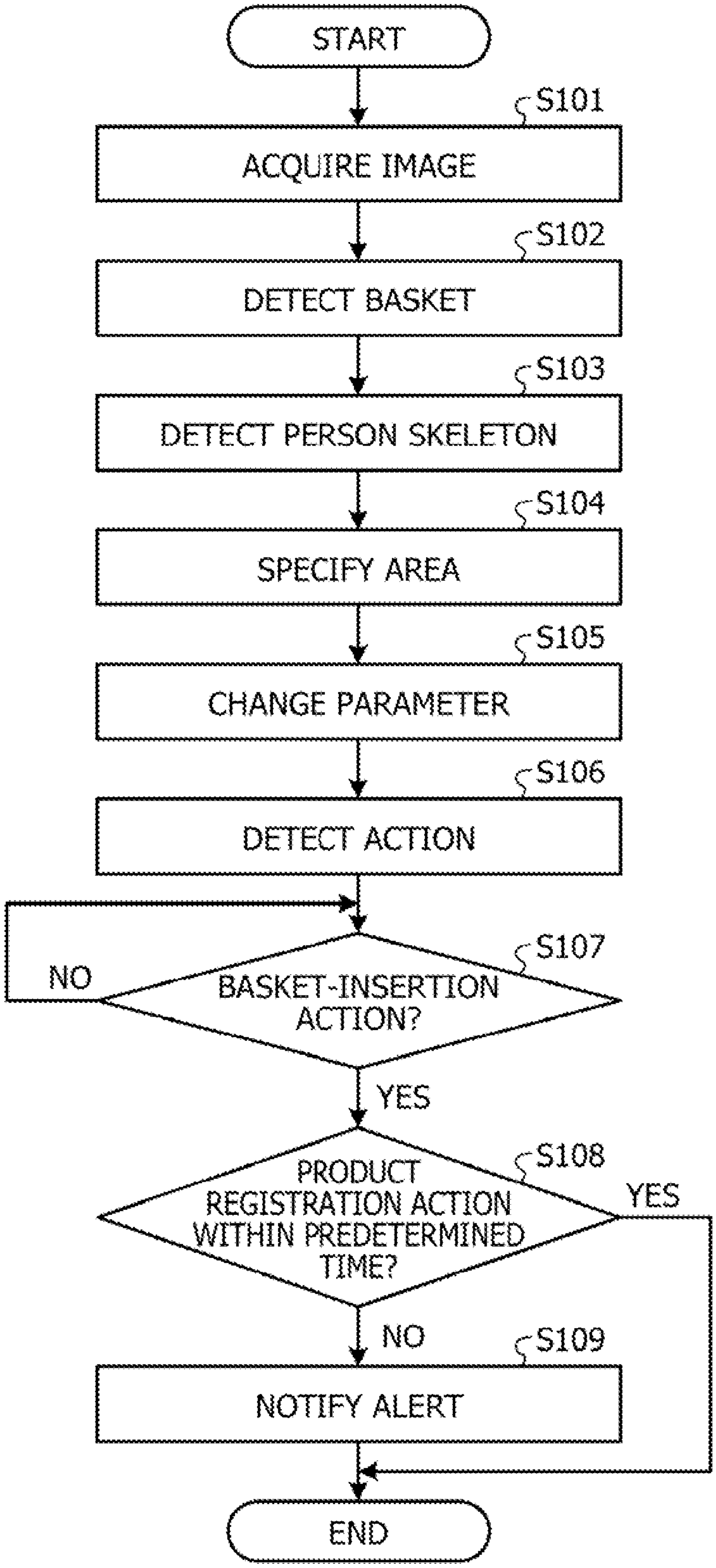
FIG. 15 is a flowchart illustrating a flow of the fraud detection processing according to the first embodiment.

Next, a flow of the fraud detection processing executed by the fraud detection device 10 will be described. FIG. 15 is a flowchart illustrating a flow of the fraud detection processing according to the first embodiment. The fraud detection processing illustrated in FIG. 15 may be executed, for example, every fixed time or every time the captured image is received from the camera device 200.

First, as illustrated in FIG. 15, the fraud detection device 10 acquires the captured image obtained by the camera device 200 capturing a predetermined imaging range such as the inside of the store of the retail store or the premises from the image DB 31 (step S101). Note that, in the fraud detection processing illustrated in FIG. 15, since the captured image captured by the camera device 200, strictly speaking, a surveillance video is processed in real time, the captured image is transmitted from the camera device 200 at any time and stored in the image DB 31.

Next, the fraud detection device 10 detects the shopping basket from the captured image acquired in step S101 by using the existing object detection algorithm (step S102).

Next, the fraud detection device 10 detects the person from the captured image acquired in step S101 using the existing object detection algorithm, and further detects the skeleton of the detected person using the existing posture estimation and skeleton estimation algorithm (step S103). Note that the execution order of steps S102 and S103 may be reversed or may be executed in parallel.

Next, the fraud detection device 10 specifies the area where the person detected in step S103 is staying (step S104). Note that, the area where the person is staying can be specified by using, for example, the positional information between the person in the captured image and the sales floor or the shelf of the product.

Next, the fraud detection device 10 changes the parameter for evaluating the person's behavior for the product on the basis of the setting information associated with the area specified in step S104 (step S105).

Next, the fraud detection device 10 detects the person's action on the basis of the basket detected in step S102, the skeleton detected in step S103, and the like (step S106). The actions detected in step S106 are, for example, the person's action to take out the product from the shelf containing the product, the person's action to put the product in the basket, the person's action to scan the product to be purchased and register the product to the user terminal 100, and the like.

Note that the product take-out action is specified in a case where, for example, after the person's hand enters an area of the product shelf or the like, the person takes a posture of standing, crouching, or bending down, and turns the arm including the hand forward, and the hand is moving at a predetermined speed or higher. Furthermore, the basket-insertion action is specified in the case where, for example, the skeleton of the person's fingers has moved in the area of the basket for a predetermined time and then moved out of the area. Furthermore, the product registration action is specified in the case where, for example, both elbows of the person are bent forward and do not move for a predetermined time within the predetermined range of the area of the basket. Note that to specify the person's action, captured images continuously captured and the basket and skeletal information detected from the captured images are needed. Therefore, in executing step S106, steps S101 to S103 may be repeated a predetermined number of times with different captured images. Furthermore, step S106 may be executed before steps S104 and S105, or may be executed in parallel.

In the case where the basket-insertion action is not detected in the action detection in step S106 (step S107: No), the fraud detection device 10 executes step S107 again after a fixed time has elapsed.

On the other hand, in the case where the basket-insertion action is detected in the action detection in step S106 (step S107: Yes), the fraud detection device 10 determines whether the product registration action is detected within a predetermined time from the detection of the basket-insertion action (step S108). In the case where the product registration action is detected within the predetermined time (step S108: Yes), it is assumed that the product scan omission has not occurred, and the fraud detection processing illustrated in FIG. 15 ends. Note that, in the case where the product registration action is performed before the basket-insertion action, the time to detect the product registration action becomes a minus time with respect to the basket-insertion action, so this case corresponds to the case of detecting the product registration action within the predetermined time (step S108: Yes).

On the other hand, in the case where the product registration action is not detected within the predetermined time (step S108: No), the fraud detection device 10 notifies the clerk terminal 300 of the alert (step S109). After the execution of step S109, the fraud detection processing illustrated in FIG. 15 ends.

[Effects]

As described above, the fraud detection device 10 generates the skeletal information of the person staying in the store from the captured image, detects a specific action of the person for the product using the skeletal information, specifies the area where the person is staying in the store when having detected the specific action using the positional information of the person in the image, specifies the setting information associated with the specified area, and changes the parameter for evaluating the behavior of the person for the product on the basis of the specified setting information.

Thereby, the fraud detection device 10 evaluates the behavior of the person on the basis of the sales area of the product in which the person is staying when detecting the specific action, and thus the fraud detection device 10 may accurately determine the customer's action that changes depending on the type, size, and the like of the product. Therefore, in the system in which the customer himself/herself performs the product scan, the fraud detection device 10 may improve the accuracy of detecting the scan omission of the product.

Furthermore, the processing of detecting the specific action executed by the fraud detection device 10 includes processing of detecting a first action of the person taking out the product from the shelf containing the product as the specific action.

Thereby, the fraud detection device 10 can evaluate the person's behavior on the basis of the sales area of the product where the person is staying when the person takes out the product from the product shelf, and thus the fraud detection device 10 may improve the accuracy of detecting the scan omission of the product in the system in which the customer himself/herself performs the product scan.

Furthermore, the processing of changing a parameter executed by the fraud detection device 10 includes processing of changing a first parameter for a speed of the first action as the parameter.

Thereby, the fraud detection device 10 may more accurately determine the customer's action that changes depending on the type, size, and the like of the product, thereby improving the accuracy of detecting the scan omission of the product in the system in which the customer himself/herself performs product scan.

Furthermore, the processing of detecting a specific action executed by the fraud detection device 10 includes processing of detecting a second action of putting the product taken out from the shelf into a shopping basket as the specific action, and the processing of changing a parameter includes processing of changing a second parameter for a speed of the second action as the parameter.

Thereby, the fraud detection device 10 may more accurately determine the customer's action that changes depending on the type, size, and the like of the product, thereby improving the accuracy of detecting the scan omission of the product in the system in which the customer himself/herself performs product scan.

Furthermore, the processing of detecting a specific action executed by the fraud detection device 10 includes processing of detecting a third action of registering the product taken out by the person from the shelf in a first terminal as the specific action, and the processing of changing a parameter includes processing of changing a third parameter for a difference in detection time between the second action and the third action as the parameter.

Thereby, the fraud detection device 10 may more accurately determine the customer's action that changes depending on the type, size, and the like of the product, thereby improving the accuracy of detecting the scan omission of the product in the system in which the customer himself/herself performs product scan.

Furthermore, the fraud detection device 10 evaluates a behavior of the person for the product on the basis of the parameter.

Thereby, the fraud detection device 10 may more accurately determine the customer's action that changes depending on the type, size, and the like of the product, thereby improving the accuracy of detecting the scan omission of the product in the system in which the customer himself/herself performs product scan.

Furthermore, the processing of evaluating the behavior executed by the fraud detection device 10 includes processing of evaluating the behavior by performing weighting on the basis of at least one of the specified area, or age or gender of the person.

Thereby, the fraud detection device 10 may evaluate the person's behavior strictly or by relaxing the evaluation criteria with respect to the product and the age and gender of the person.

Furthermore, the fraud detection device 10 notifies a second terminal of an alert in a case where the person is evaluated to have performed fraudulence by the processing of evaluating the behavior.

Thereby, the fraud detection device 10 may notify the clerk in the case of detecting the scan omission of the product in the system where the customer himself/herself performs the product scan.

[System]

Pieces of the information including a processing procedure, a control procedure, a specific name, various types of data, and parameters described above or illustrated in the drawings may be changed in any ways unless otherwise specified. Furthermore, the specific examples, distributions, numerical values, and the like described in the embodiments are merely examples, and may be changed in any ways.

Furthermore, specific forms of distribution and integration of the configuration elements of the respective devices are not limited to those illustrated in the drawings. That is, all or some of the configuration elements may be functionally or physically distributed or integrated in any units according to various types of loads, usage situations, or the like. Moreover, all or any part of the respective processing functions of the respective devices may be implemented by a central processing unit (CPU) and a program analyzed and executed by the CPU, or may be implemented as hardware by wired logic.

[Hardware]

Figure 16:
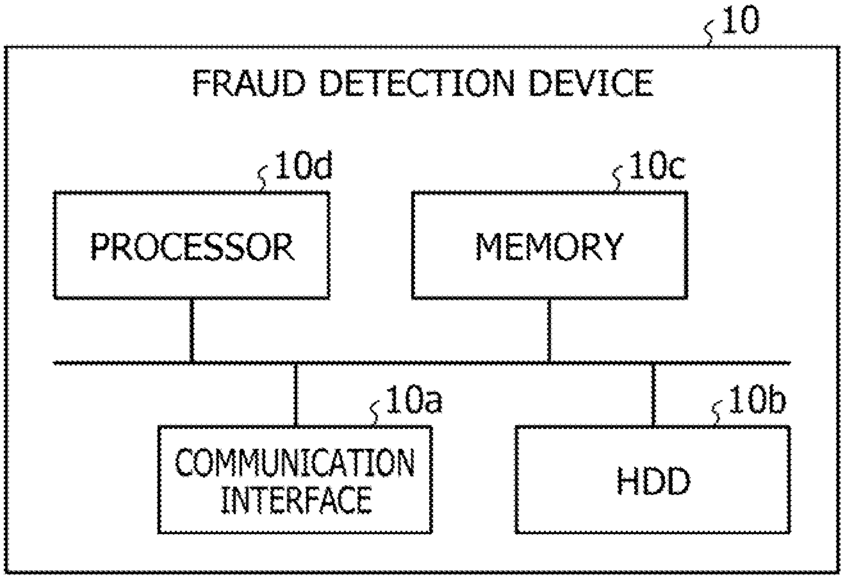
FIG. 16 is a diagram for describing a hardware configuration example of the fraud detection device 10.

FIG. 16 is a diagram for describing a hardware configuration example of the fraud detection device 10. As illustrated in FIG. 16, the fraud detection device 10 includes a communication interface 10*a*, a hard disk drive (HDD) 10*b*, a memory 10*c*, and a processor 10*d*. Furthermore, the respective units illustrated in FIG. 16 are mutually connected by a bus or the like.

The communication interface 10*a* is a network interface card or the like and communicates with another information processing device. The HDD 10*b* stores programs and data for operating the functions illustrated in FIG. 5.

The processor 10*d* is a hardware circuit that reads a program that executes processing similar to the processing of each processing unit illustrated in FIG. 5 from the HDD 10*b* or the like, and expands the read program in the memory 10*c* to operate a process that executes each function described with reference to FIG. 5 or the like. For example, this process executes a function similar to each processing unit included in the fraud detection device 10. Specifically, the processor 10*d* reads a program having functions similar to the functions of the specifying unit 41, the generation unit 42, the evaluation unit 43, the notification unit 44, and the like from the HDD 10*b* or the like. Then, the processor 10*d* executes a process that executes processing similar to the processing of the specifying unit 41 or the like.

In this way, the fraud detection device 10 operates as an information processing device that executes operation control processing by reading and executing the program that executes similar processing to each processing unit illustrated in FIG. 5. Furthermore, the fraud detection device 10 can also implement functions similar to the above-described embodiments by reading the program from a recording medium by a medium reading device and executing the read program. Note that the program referred to in this another embodiment is not limited to being executed by the fraud detection device 10. For example, the present embodiment may be similarly applied to a case where another computer or server executes the program, or a case where these computer and server cooperatively execute the program.

Furthermore, the program that executes similar processing to each processing unit illustrated in FIG. 5 can be distributed via a network such as the Internet. Furthermore, this program can be recorded in a computer-readable recording medium such as a hard disk, flexible disk (FD), compact disc read only memory (CD-ROM), magneto-optical disk (MO), or digital versatile disc (DVD), and can be executed by being read from the recording medium by a computer.

Figure 17:
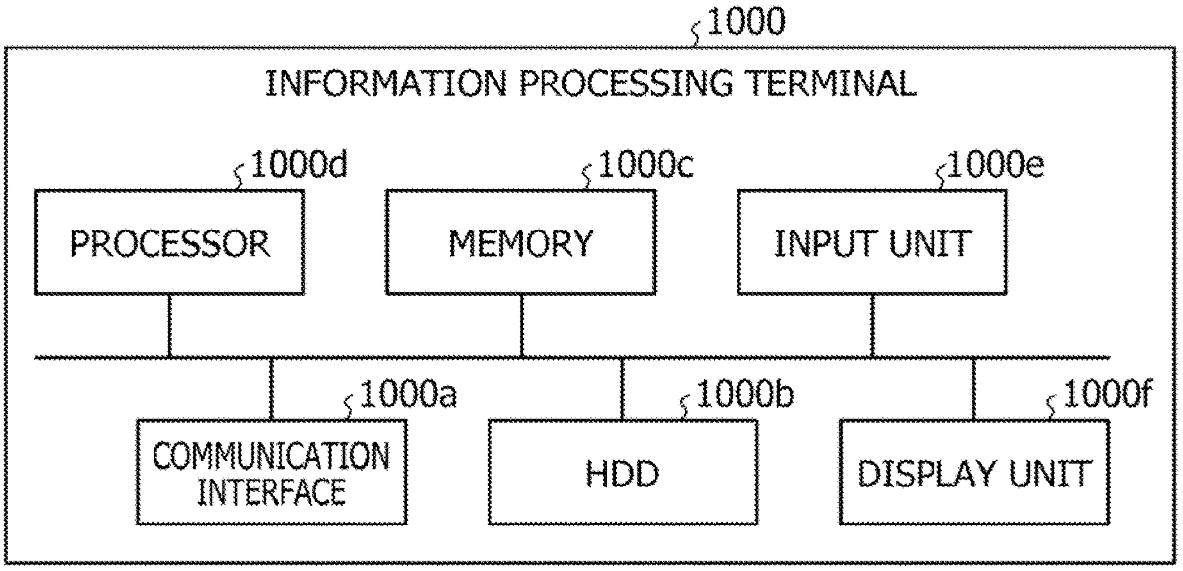
FIG. 17 is a diagram for describing a hardware configuration example of an information processing terminal 1000.

FIG. 17 is a diagram for describing a hardware configuration example of an information processing terminal 1000. Since the user terminal 100 and the clerk terminal 300 may have a similar configuration, FIG. 17 illustrates a hardware configuration example of the user terminal 100 and the clerk terminal 300, collectively referring to the user terminal 100 and the clerk terminal 300 as the information processing terminal 1000. As illustrated in FIG. 17, the information processing terminal 1000 has a communication interface 1000*a*, an HDD 1000*b*, a memory 1000*c*, a processor 1000*d*, an input unit 1000*e*, and a display unit 1000*f*. Furthermore, the respective units illustrated in FIG. 17 are mutually connected by a bus or the like.

The communication interface 1000*a* is a network interface card or the like, and communicates with other information processing devices. The HDD 1000*b* stores a program and data for operating each function of the information processing terminal 1000.

The processor 1000D is a hardware circuit that reads the program that executes processing of each function of the information processing terminal 1000 from the HDD 1000*b* or the like and expands the read program in the memory 1000*c* to operate a process that executes each function of the information processing terminal 1000. For example, this process executes a function similar to each processing unit included in the information processing terminal 1000.

In this way, the information processing terminal 1000 operates as an information processing device that executes operation control processing by reading and executing the program that executes processing of each function of the information processing terminal 1000. Furthermore, the information processing terminal 1000 can also implement each function of the information processing terminal 1000 by reading the program from a recording medium by the medium reading device and executing the read program. Note that the program referred to in this another embodiment is not limited to being executed by the information processing terminal 1000. For example, the present embodiment may be similarly applied to a case where another computer or server executes the program, or a case where these computer and server cooperatively execute the program.

Furthermore, the program that executes the processing of each function of the information processing terminal 1000 can be distributed via a network such as the Internet. Furthermore, this program can be recorded on a computer-readable recording medium such as a hard disk, an FD, a CD-ROM, an MO, or a DVD, and can be executed by being read from the recording medium by a computer.

The input unit 1000*e* detects various input operations by the user, such as an input operation for the program executed by the processor 1000D. The input operations include, for example, a touch operation, insertion of an earphone terminal into the information processing terminal 1000, and the like. Here, the touch operations refer to various contact operations with respect to the display unit 1000*f*, such as tapping, double tapping, swiping, and pinching, for example. Furthermore, the touch operation includes an action of bringing an object such as a finger closer to the display unit 1000*f*, for example. The input unit 1000*e* may be, for example, a button, a touch panel, a proximity sensor, and the like.

The display unit 1000*f* displays various types of visual information on the basis of control by the processor 1000*d*. The display unit 1000*f* is a liquid crystal display (LCD), an organic light emitting diode (OLED), a so-called organic electro luminescence (EL) display, or the like.

Figure 18:
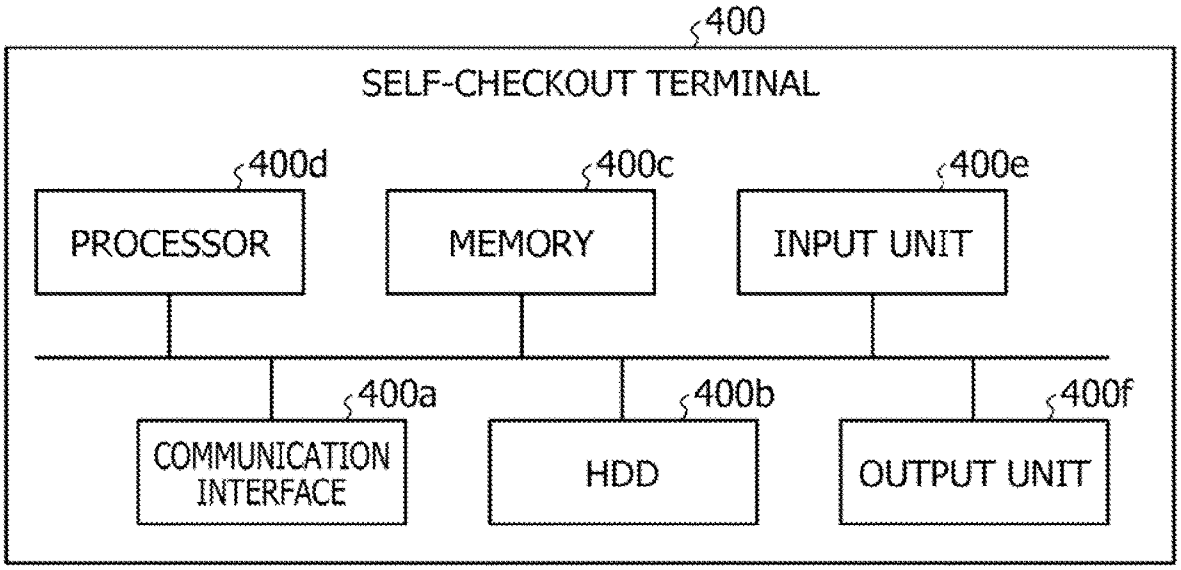
FIG. 18 is a diagram for describing a hardware configuration example of a self-checkout terminal 400.

FIG. 18 is a diagram for describing a hardware configuration example of the self-checkout terminal 400. As illustrated in FIG. 18, the self-checkout terminal 400 includes a communication interface 400*a*, an HDD 400*b*, a memory 400*c*, a processor 400*d*, an input unit 400*e*, and an output unit 400*f*. Furthermore, the respective units illustrated in FIG. 18 are mutually connected by a bus or the like.

The communication interface 400*a* is a network interface card or the like, and communicates with other information processing devices. The HDD 400*b* stores a program and data for operating each function of the self-checkout terminal 400.

The processor 400*d* is a hardware circuit that reads the program that executes processing of each function of the self-checkout terminal 400 from the HDD 400*b* or the like and expands the read program in the memory 400*c* to operate a process that executes each function of the self-checkout terminal 400. For example, this process executes a function similar to each processing unit included in the self-checkout terminal 400.

In this way, the self-checkout terminal 400 operates as an information processing device that executes operation control processing by reading and executing the program that executes processing of each function of the self-checkout terminal 400. Furthermore, the self-checkout terminal 400 can also implement the respective functions of the self-checkout terminal 400 by reading the program from a recording medium by the medium reading device and executing the read program. Note that the program mentioned in this another embodiment is not limited to being executed by the self-checkout terminal 400. For example, the present embodiment may be similarly applied to a case where another computer or server executes the program, or a case where these computer and server cooperatively execute the program.

Furthermore, the program that executes the processing of each function of the self-checkout terminal 400 can be distributed via a network such as the Internet. Furthermore, this program can be recorded on a computer-readable recording medium such as a hard disk, an FD, a CD-ROM, an MO, or a DVD, and can be executed by being read from the recording medium by a computer.

The input unit 400*e* detects various input operations by the user, such as an input operation for the program executed by the processor 400*d*. The input operation includes, for example, a touch operation or the like. In the case of a touch operation, the self-checkout terminal 400 further includes a display unit, and the input operation detected by the input unit 400*e* may be a touch operation on the display unit. The input unit 400*e* may be, for example, a button, a touch panel, a proximity sensor, and the like.

The output unit 400*f* outputs data output from the program executed by the processor 400*d* via an external device connected to the self-checkout terminal 400, for example, an external display device or the like. Note that in the case where the self-checkout terminal 400 includes a display unit, the self-checkout terminal 400 does not have to include the output unit 400*f*.

Figure 19:
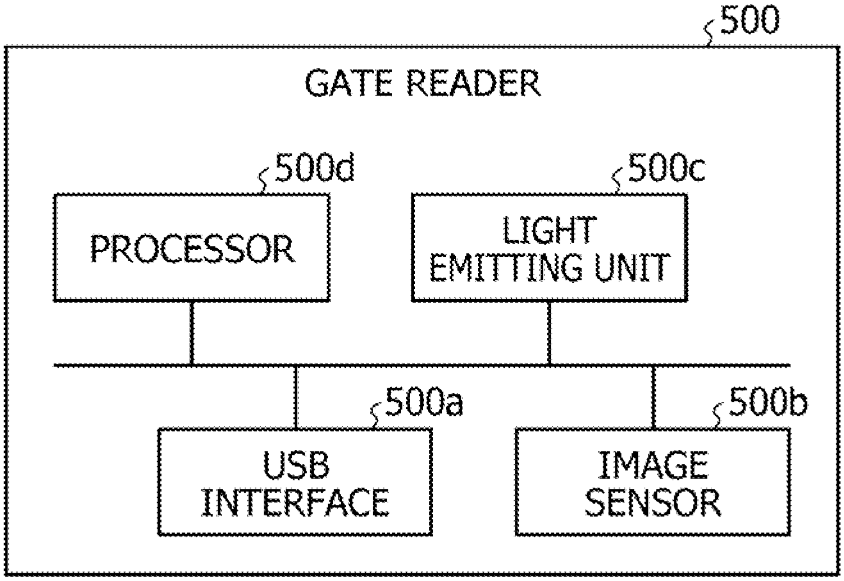
FIG. 19 is a diagram for describing a hardware configuration example of a gate reader 500.

FIG. 19 is a diagram for describing a hardware configuration example of the gate reader 500. As illustrated in FIG. 19, the gate reader 500 includes a USB interface 500*a*, an image sensor 500*b*, a light emitting unit 500*c*, and a processor 500*d*. Furthermore, the respective units illustrated in FIG. 19 are mutually connected by a bus or the like.

The USB interface 500*a* communicates with other information processing devices.

The image sensor 500*b* receives light emitted or reflected by an object read by the gate reader 500, and converts brightness and darkness of the light into electric information.

The light emitting unit 500*c* is an illumination light source such as a high-intensity LED, and irradiates the object read by the gate reader 500 with light to easily read the object. Note that, in a case where the object read by the gate reader 500, a device for displaying the object, or the like emits light, the gate reader 500 does not have to include the light emitting unit 500*c*.

The processor 500*d* controls the light emitting unit 500*c* to irradiate the object with light, and controls the image sensor 500*b* to convert the object into electrical information and read the electric information. Furthermore, the processor 500*d* transmits the read electric information of the object to another information processing device via the USB interface 500*a*.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an information processing program for causing a computer to execute processing comprising:

generating skeletal information of a person who stays in a store from a captured image;

detecting a first action in which the person takes out a product from a shelf that contains the product, a second action of putting the product taken out from the shelf into a shopping basket and a third action of registering the product taken out by the person from the shelf to the first terminal as specific actions of the person for the product using the skeletal information;

specifying an area where the person is staying when having detected any one of the specific actions in the store using positional information of the person in the image;

specifying a product characteristic associated with the specified area, the product characteristic being one of a product type, a product size, or a price range of products sold in the specified area;

dynamically adjusting, based on the specified product characteristic, a plurality of parameters including a first speed threshold used to detect the first action, second speed threshold used to detect the second action, and a threshold time for a difference in detection times between the second action and the third action; and determining a scan omission if the third action is not detected within the threshold time after the second action, wherein, when the product characteristic indicates a larger product size, the first and second speed thresholds are set to be lower, and the threshold time is set to be longer.

2. The non-transitory computer-readable recording medium according to claim 1, for causing the computer to further execute processing comprising:

evaluating the behavior of the person for the product on the basis of the threshold time.

3. The non-transitory computer-readable recording medium according to claim 2, wherein the processing of evaluating the behavior includes processing of evaluating the behavior by performing weighting on the basis of at least one of the specified area, or age or gender of the person.

4. The non-transitory computer-readable recording medium according to claim 2, for causing the computer to further execute processing comprising:

notifying a second terminal of an alert in a case where the person is evaluated to have performed the scan omission by the processing of evaluating the behavior.

5. An information processing method comprising:

generating skeletal information of a person who stays in a store from a captured image;

detecting a first action in which the person takes out a product from a shelf that contains the product, a second action of putting the product taken out from the shelf into a shopping basket and a third action of registering the product taken out by the person from the shelf to the first terminal as specific actions of the person for the product using the skeletal information;

specifying an area where the person is staying when having detected any one of the specific actions in the store using positional information of the person in the image;

specifying a product characteristic associated with the specified area, the product characteristic being one of a product type, a product size, or a price range of products sold in the specified area;

dynamically adjusting, based on the specified product characteristic, a plurality of parameters including a first speed threshold used to detect the first action, second speed threshold used to detect the second action, and a threshold time for a difference in detection times between the second action and the third action; and determining a scan omission if the third action is not detected within the threshold time after the second action, wherein, when the product characteristic indicates a larger product size, the first and second speed thresholds are set to be lower, and the threshold time is set to be longer.

6. The information processing method according to claim 5, for causing the computer to further execute processing comprising:

evaluating the behavior of the person for the product on the basis of the threshold time.

7. The information processing method according to claim 6, wherein the processing of evaluating the behavior includes processing of evaluating the behavior by performing weighting on the basis of at least one of the specified area, or age or gender of the person.

8. The information processing method according to claim 6, for causing the computer to further execute processing comprising:

notifying a second terminal of an alert in a case where the person is evaluated to have performed the scan omission by the processing of evaluating the behavior.

9. An information processing device comprising:

a memory; and a processor coupled to the memory and configured to:

generate skeletal information of a person who stays in a store from a captured image;

detect a first action in which the person takes out a product from a shelf that contains the product, a second action of putting the product taken out from the shelf into a shopping basket and a third action of registering the product taken out by the person from the shelf to the first terminal as specific actions of the person for the product using the skeletal information;

specify an area where the person is staying when having detected any one of the specific actions in the store using positional information of the person in the image;

specify a product characteristic associated with the specified area, the product characteristic being one of a product type, a product size, or a price range of products sold in the specified area;

dynamically adjust, based on the specified product characteristic, a plurality of parameters including a first speed threshold used to detect the first action, second speed threshold used to detect the second action, and a threshold time for a difference in detection times between the second action and the third action; and determining a scan omission if the third action is not detected within the threshold time after the second action, wherein, when the product characteristic indicates a larger product size, the first and second speed thresholds are set to be lower, and the threshold time is set to be longer.

* * * * *